United States Patent
Tsujibayashi et al.

(10) Patent No.: US 7,252,320 B2
(45) Date of Patent: Aug. 7, 2007

(54) FOLDABLE AND STORABLE SEAT FOR VEHICLE

(75) Inventors: Toshiyuki Tsujibayashi, Tochigi (JP); Hiroshi Izawa, Tochigi (JP); Shinobu Sato, Saitama (JP); Koji Kamida, Saitama (JP); Osamu Kyogoku, Saitama (JP); Tamotsu Oishi, Saitama (JP)

(73) Assignees: TS Tech Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/228,631

(22) Filed: Sep. 16, 2005

(65) Prior Publication Data

US 2006/0066123 A1    Mar. 30, 2006

(30) Foreign Application Priority Data

| Sep. 16, 2004 | (JP) | ............................. 2004-269460 |
| Sep. 16, 2004 | (JP) | ............................. 2004-269657 |
| Sep. 16, 2004 | (JP) | ............................. 2004-269872 |
| Sep. 16, 2004 | (JP) | ............................. 2004-269948 |
| Sep. 17, 2004 | (JP) | ............................. 2004-271239 |
| Sep. 17, 2004 | (JP) | ............................. 2004-271298 |
| Sep. 17, 2004 | (JP) | ............................. 2004-271315 |

(51) Int. Cl.
    *B60N 2/10*    (2006.01)

(52) U.S. Cl. .............................. 296/65.09; 296/65.05; 297/378.14; 297/335; 297/325

(58) Field of Classification Search ............. 296/65.09, 296/65.05; 297/378.14, 15, 331, 325, 335
    See application file for complete search history.

(56) References Cited

U.S. PATENT DOCUMENTS

| 5,482,349 | A  | * | 1/1996 | Richter et al. ................. 297/15 |
| 6,070,934 | A  | * | 6/2000 | Schaefer et al. ............... 297/14 |
| 6,231,101 | B1 | * | 5/2001 | Kamida et al. ................ 296/63 |
| 6,644,730 | B2 | * | 11/2003 | Sugiura et al. ................ 297/15 |
| 6,682,120 | B2 | * | 1/2004 | Kamida et al. ........... 296/65.09 |
| 6,698,837 | B2 | * | 3/2004 | Pejathaya et al. ...... 297/378.12 |
| 6,869,138 | B2 | * | 3/2005 | Rhodes et al. ................. 297/15 |
| 6,955,386 | B2 | * | 10/2005 | Rhodes et al. ........... 296/65.09 |
| 6,974,174 | B2 | * | 12/2005 | Imajo et al. ............. 296/65.09 |
| 2004/0046408 | A1 | * | 3/2004 | Satoh et al. ............. 296/65.09 |
| 2004/0227386 | A1 | * | 11/2004 | Tsujibayashi et al. .... 297/344.1 |
| 2005/0057081 | A1 | * | 3/2005 | Kahn et al. ................. 297/331 |
| 2006/0061183 | A1 | * | 3/2006 | White et al. ........... 297/378.12 |

\* cited by examiner

*Primary Examiner*—Dennis H. Pedder
*Assistant Examiner*—Michael Hernandez
(74) *Attorney, Agent, or Firm*—Dann, Dorfman, Herrell & Skillman, P.C.

(57) ABSTRACT

A foldable and storable seat for a vehicle is disclosed. The vehicle seat includes a seat cushion pivotally supported at a rear portion thereof to a vehicle floor by a pair of spaced apart base brackets, cooperating members for causing a forward portion of the seat cushion to be releasably supported to the vehicle floor, a seat back pivotally supported to the seat cushion, recliner devices for releasably locking the seat back relative to the seat cushion, the seat cushion and the seat back being foldable so as to be put together when the seat back is released from the seat cushion by the recliner devices, and a linkage mechanism mounted to the seat cushion, the linkage mechanism including a first linkage section for causing the recliner devices to be actuated synchronously with pivotal movement of the vehicle seat, and the first linkage section being coupled to one of the base brackets and the recliner devices.

12 Claims, 23 Drawing Sheets

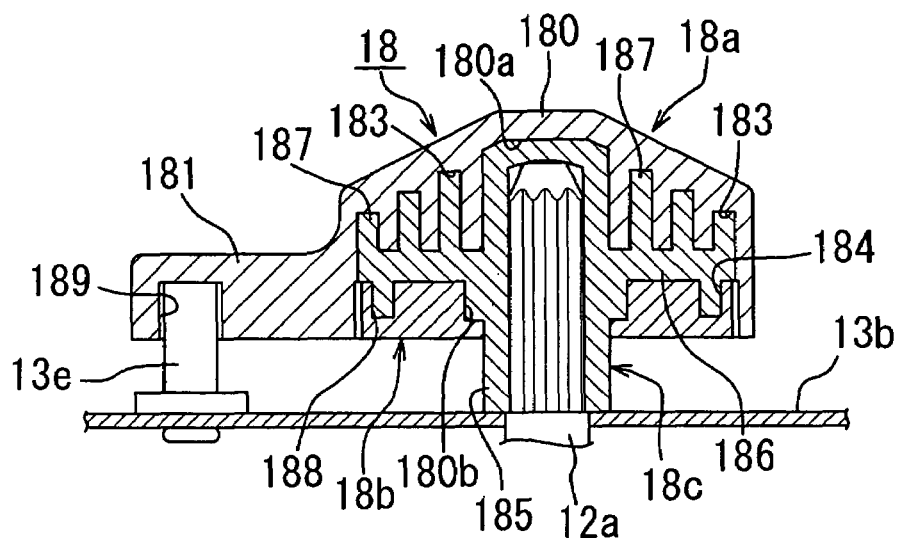

FOLDABLE AND STORABLE SEAT FOR VEHICLE

FIELD OF THE INVENTION

This invention relates to a foldable and storable seat for a vehicle, and more particularly to a vehicle seat that can be stored by causing a seat cushion of the vehicle seat and a seat back of the vehicle seat to be folded so as to be put together and then causing the entire vehicle seat to be pivoted rearward, in order that a storage space for cargo is obtained in an interior of a vehicle.

DESCRIPTION OF THE PRIOR ART

Hitherto, as an example of such a vehicle seat, there has been known a third seat for a vehicle, which is designed so as to facilitate obtaining of a storage space for cargo in an interior of a vehicle (Japanese Patent Application laid open under Provisionary Publication No. Hei. 11-310068). The conventional vehicle seat comprises a seat cushion pivotally supported at a rear section thereof to spaced apart base brackets that are mounted to a vehicle floor, a seat back pivotally supported to the seat cushion, and recliner devices for releasably locking the seat back relative to the seat cushion. In order that the storage space for cargo is obtained in the interior of the vehicle, the seat back is released from the seat cushion by the recliner devices, the seat back and seat cushion are folded so as to be put together, and the entire vehicle seat is pivoted rearward and then stored in a storage recess portion that is formed in a floor of the vehicle.

Regarding such a conventional foldable and storable vehicle seat, attempts have been made to provide a seat leg for causing a forward section of the seat cushion to be supported relative to the vehicle floor. The seat leg is pivotally supported to a forward portion of a bottom of the seat cushion and provided at a lower portion thereof with striker locks which are releasably engaged with a striker mounted to the vehicle floor. When the striker locks are releasably engaged with the striker, the seat cushion is kept horizontal by the seat leg. In this condition, a user can sit on the vehicle seat.

When the vehicle seat is to be stored in order that the storage space for cargo is obtained in the interior of the vehicle, in addition to an operation for causing the striker locks to be actuated so as to release the striker therefrom, the user must carry out an operation for causing the seat leg to be folded so as to lie flat against a bottom surface of the seat cushion, and an operation for causing the recliner devices to be actuated so as to release the seat back from the seat cushion, before the user causes the entire vehicle seat to be pivoted rearward. This is considerably troublesome. Similarly, when the vehicle seat is to be pivoted to its seating position from its stored position, the user must carry out an operation for causing the seat leg to be pivoted to its use position. This is also considerably troublesome.

Generally, an occupant having sat on the vehicle seat when the vehicle is running should use a seat belt. The seat belt is generally used so as to be obliquely extended from a side of the vehicle toward to a side of the vehicle seat that is adjacent a center portion of the vehicle, so that a twisting force may be applied to the vehicle seat by the use of the seat belt while the vehicle is running. Therefore, the vehicle seat is preferably designed so as to resist the twisting force that may be applied to the vehicle seat by the use of the seat belt while the vehicle is running.

The vehicle seat is pivoted rearward or forward, so that the vehicle seat is preferably provided with a pull pocket structure, into a hollow section of which a user inserts a user's hand when the user causes the vehicle seat to be pivoted. The user can cause the vehicle seat to be pivoted while inserting the user's hand into the hollow section of the pull pocket structure and lifting up the vehicle seat by the hand. Such a pull pocket structure is required to be attached to a portion of the vehicle seat which does not exert adverse effect on a seating feeling of the occupant having sat on the vehicle seat.

Furthermore, in order that a visual appearance of the vehicle seat is improved, it is preferable that the vehicle seat is provided with a cover for concealing the seat leg and the striker locks.

SUMMARY OF THE INVENTION

The present invention has been made with a view to overcoming the foregoing problems.

It is therefore an object of this invention to provide a foldable and storable vehicle seat in which synchronously with pivotal movement of the vehicle seat, a seat back of the vehicle seat and a seat cushion of the vehicle seat are operatively folded so as to be put together and/or a seat leg that is pivotally supported to the seat cushion is pivoted.

It is another object of the present invention to provide a foldable and storable vehicle seat which can resist a twisting force that may be applied to the vehicle seat by the use of a seat belt while a vehicle is running.

It is still another object of the present invention to provide a foldable and storable vehicle seat which is provided with a pull pocket structure that is attached to a portion of the vehicle seat which does not exert adverse effect on a seating feeling of an occupant having sat on the vehicle seat.

It is yet another object of the present invention to provide a foldable and storable vehicle seat which has a good visual appearance.

In accordance with the present invention, there is provided a foldable and storable seat for a vehicle. The vehicle seat comprises a seat cushion pivotally supported at a rear portion thereof to a vehicle floor by a pair of spaced apart base brackets, cooperating means for causing a forward portion of the seat cushion to be releasably supported to the vehicle floor, a seat back pivotally supported to the seat cushion, recliner means for releasably locking the seat back relative to the seat cushion, the seat cushion and the seat back being foldable so as to be put together when the seat back is released from the seat cushion by the recliner means, and linkage means mounted to the seat cushion, the linkage means including a first linkage section for causing the recliner means to be actuated synchronously with pivotal movement of the vehicle seat, and the first linkage section being coupled to one of the base brackets and the recliner means.

The vehicle seat further include a seat leg means pivotally supported to a bottom of the seat cushion. The linkage means further includes a second linkage section for causing the seat leg means to be folded so as to lie against a surface of the bottom of the seat cushion synchronously with folding of the seat cushion and the seat back, and causing the seat leg means to be pivoted to its use position synchronously with forward pivotal movement of the vehicle seat.

The vehicle seat may further include a damper means for causing pivotal movement of the vehicle seat to be decelerated. The damper means is combined with the first linkage section.

The cooperating means comprises a striker mounted to the vehicle floor and striker lock means attached to a lower portion of the seat leg means and adapted to be releasably engaged with the striker. The seat leg means and the striker lock means are covered with an armor cover.

The spaced apart base brackets are mounted on the vehicle floor. The seat cushion is pivotally supported at the rear portion thereof to the spaced apart base brackets by supporting shafts. The vehicle seat further includes a plurality of spiral springs mounted around a supporting shaft which is attached to at least one of the spaced apart base brackets which is arranged adjacent a center portion of the vehicle. The spiral springs are arranged side by side along the supporting shaft. The spiral springs serve as means to facilitate forward pivotal movement of the vehicle seat and serve as means to add stiffness to the supporting shaft and the at least one of the base bracket.

The seat back includes a seat back frame having a bracket plate arranged in proximity to a side of the seat back frame which is adjacent a center portion of the vehicle, an operating lever for causing the striker lock means of the seat leg means to be disengaged from the striker, and an actuating lever for causing the recliner means to be actuated. The operating lever and the actuating lever are pivotally supported to the bracket plate so as to be disposed in close proximity to each other. The actuating lever has a traction strap extending rearward of the seat back from the actuating lever.

The seat cushion includes a seat cushion frame. The vehicle seat further includes a pull pocket structure having a hollow section into which a user can insert a user's hand when the vehicle seat is pivoted. The pull pocket structure is attached to a suitable portion of the seat cushion frame or of the seat back frame which does not exert adverse effect on a seating feeling of an occupant having sat on the vehicle seat.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals denote the same parts throughout the Figures and wherein:

FIG. 9 is a schematic sectional view of a damper means;

FIG. 10 is a schematic plan view of the linkage means with the damper means;

DETAILED DESCRIPTION OF THE PREFERRED EMBODIMENTS

Vehicle seats according to embodiments of the present invention will be discussed hereinafter with reference to the accompanying drawings.

Figure 1:
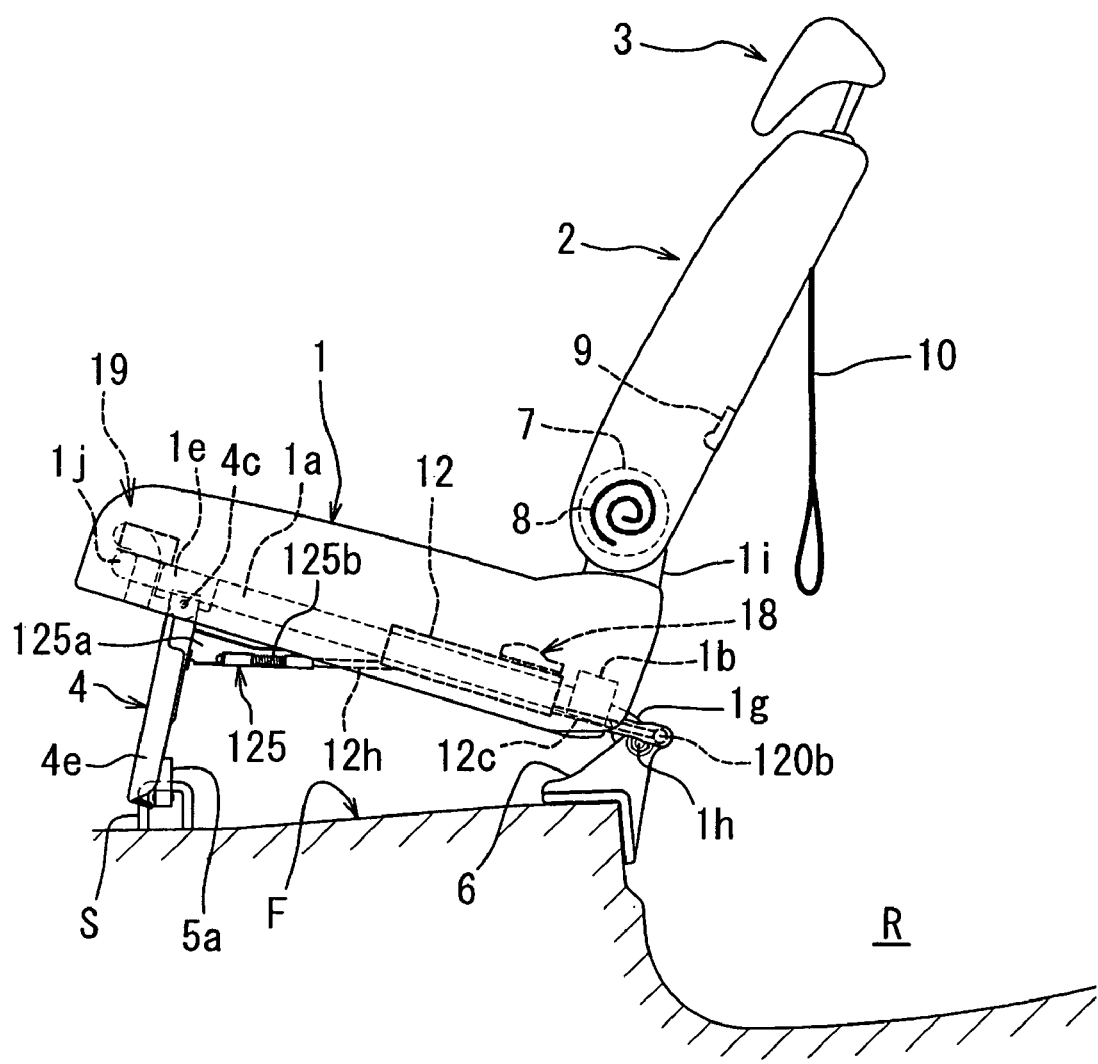
FIG. 1 is a schematic side elevational view of a foldable and storable vehicle seat according to a first embodiment of the present invention.

Referring to FIG. 1, there is illustrated a vehicle seat according to a first embodiment of the present invention, which is designed as a rear seat for a vehicle. The rear seat generally includes a seat cushion 1, a seat back 2 pivotally supported to the seat cushion 1, a head rest 3 movably supported to the seat back 2, first and second recliner devices for securing and releasing the seat back 2 relative to the seat cushion 1 (only a first recliner device 7 is shown in FIG. 1), a seat leg means 4 pivotally supported to a forward portion of a bottom of the seat cushion 1 so as to be movable between a use or extended position and a non-use or folded position, and linkage means 12 for causing the recliner devices to be actuated and/or causing the seat leg means 4 to be pivoted. In the illustrated example, the linkage means 12 is designed such that the linkage means 12 comprises a first linkage section for causing the recliner devices to be actuated (hereinafter referred to as "a recliner device-driving linkage section) and a second linkage section for causing the seat leg means 4 to be pivoted (hereinafter referred to as "a seat leg means-driving linkage section). The rear seat is constructed such that the seat leg means 4 is operatively folded so as to lie flat against a bottom surface of the seat cushion 1, the seat cushion 1 and the seat back 2 are operatively folded so as to be put together, and the entire rear seat is pivoted rearward and then stored within a storage recess portion R that is formed in a vehicle floor F. More particularly, the entire vehicle seat is adapted to be pivoted between a seating position in which a user is allowed to sit on the vehicle seat, and a stored position in which the entire vehicle seat is stored in the storage recess portion R.

Figure 2:
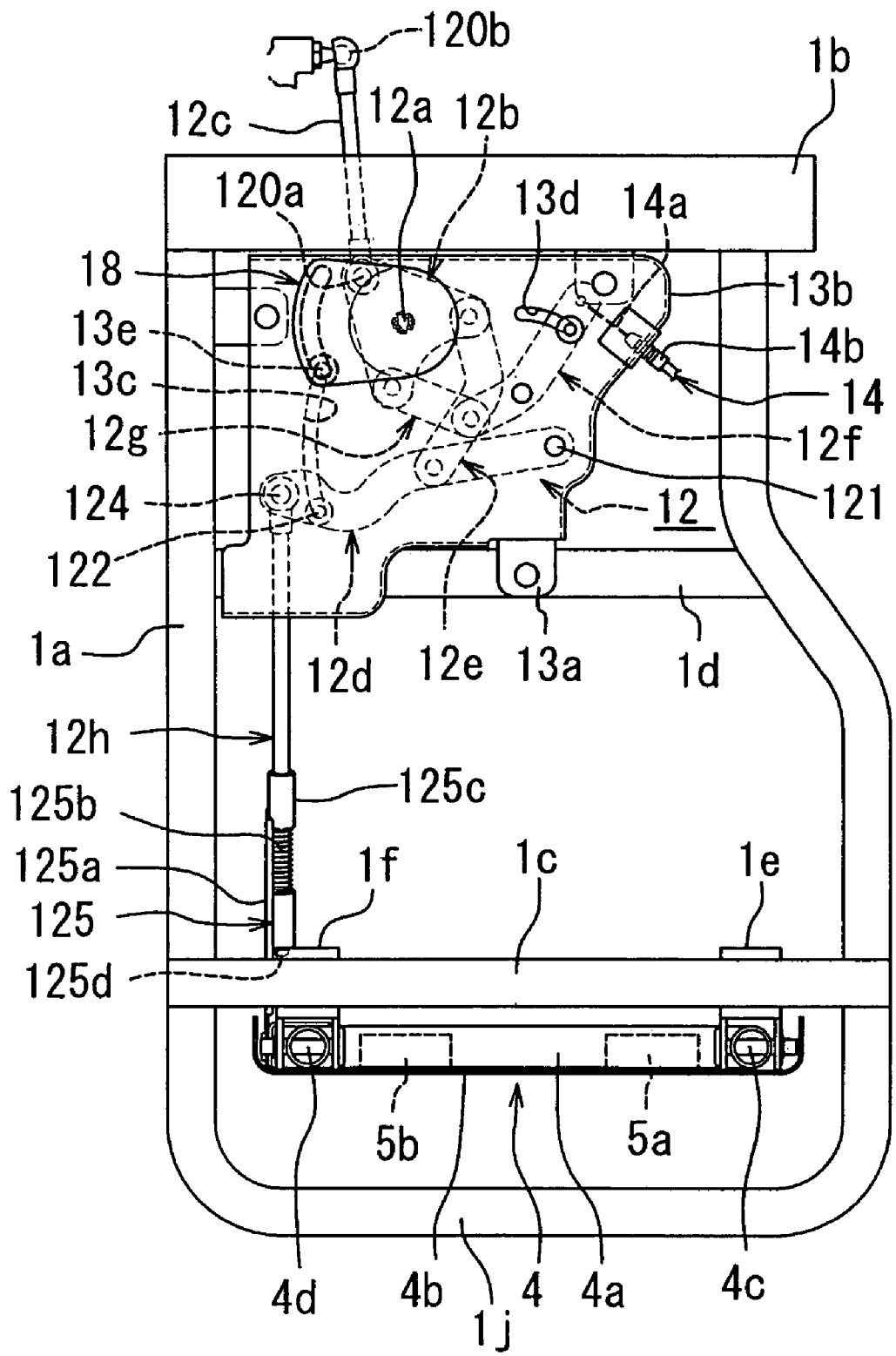
FIG. 2 is a schematic plan view of a seat cushion frame of a seat cushion of the vehicle seat.

Referring to FIG. 2, the seat cushion 1 includes a seat cushion frame that comprises a main frame section 1a of a substantially U-shape, a rear side frame section 1b interconnecting rear ends of the substantially U-shaped main frame section 1a, and first and second spaced apart cross beams 1c, 1d bridged between both sides of the substantially U-shaped main frame section 1a.

The seat cushion 1 is pivotally supported at a rear side thereof to the vehicle floor F as will be discussed in greater detail hereinafter, and is adapted to be releasably supported at the forward section of the seat cushion 1 to the vehicle floor F via the seat leg means 4. The seat leg means 4 comprises a leg body 4a that is formed by bending a pipe into a substantially U-shape, a front side plate 4b (see FIG. 2) attached to the leg body 4a and a resinous armor cover 4e (see FIG. 1) attached to the front side plate 4b for concealing the leg body 4a and the front side plate 4b. The leg means 4 is pivotally supported to the first cross beam 1c that is adjacent a forward section of the seat cushion frame, with upper end portions of the substantially U-shaped leg body 4a being pivotally coupled via supporting pins 4c, 4d to bearing brackets 1e, 1f that are mounted to the first cross beam 1c so as to be spaced apart from each other along the first cross beam 1c. In the non-use or folded position, the leg means 4 may be stored within a, storage recess portion (not shown) formed in the bottom surface of the seat cushion 1. The leg means 4 is provided with the resinous armor cover 4e for concealing the leg body 4a and the front side plate 4b as discussed above, so that the visual appearance of the vehicle seat is improved.

The seat cushion 1 is pivotally supported at the rear side thereof to a pair of spaced apart base brackets 6 (only one base bracket 6 is shown in FIG. 1) that are mounted to the vehicle floor F. More particularly, the rear side frame section 1b of the seat cushion frame is provided with a pair of spaced apart bearing brackets 1g (only one bearing bracket 1g is shown in FIG. 1) that project rearward from the rear side frame section 1b. The bearing brackets 1g of the seat cushion 1 are pivotally coupled to the base brackets 6 via supporting shafts 1h (only one supporting shaft 1h is shown in FIG. 1), so that the entire vehicle seat including the seat cushion 1 and the seat back 2 can be pivoted between the seating position and the stored position about the supporting shafts 1h.

The vehicle seat further includes cooperating means for releasably locking the seat leg means with respect to the vehicle floor F. The cooperating means comprises a striker S of a substantially inverted U-shape attached to the vehicle floor F and standing up from the vehicle floor F, and striker locks 5a, 5b mounted to a lower portion of the front side plate 4b of the leg means 4 and adapted to be releasably engaged with the striker S. When the striker locks 5a, 5b that are provided at the leg means 4 are releasably engaged with the striker S, the seat cushion 1 is supported at the forward section thereof to the vehicle floor F by the seat leg means 4. In this condition, the user can sit on the vehicle seat.

The seat cushion 1 has a pair of spaced apart side brackets 1i (only one side bracket 1i is shown in FIG. 1), which stand up from the rear portion of the seat cushion 1. The seat back 2 is provided with a pair of spaced apart side brackets 2a, 2a' (see FIG. 3). The seat back 2 is pivotally supported relative to the seat cushion 1 via the first and second recliner devices.

Figure 3:
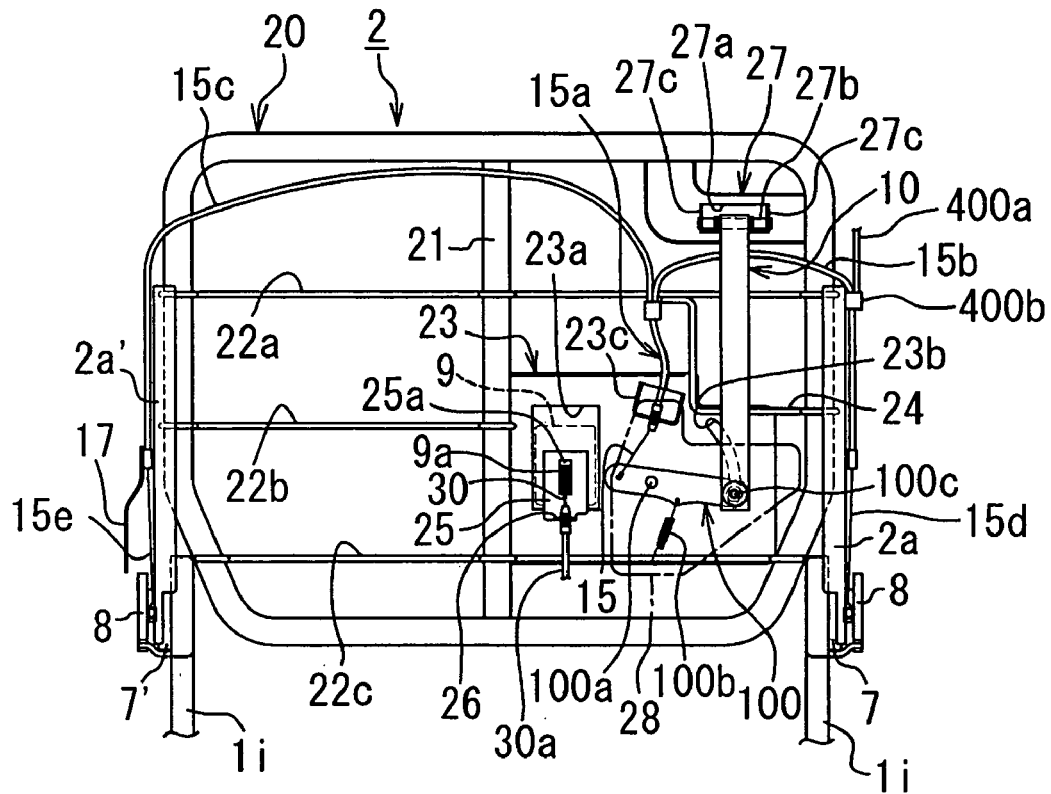
FIG. 3 is a schematic front elevational view of a seat back frame of a seat back of the vehicle seat.

Referring now to FIG. 3, the first recliner device 7 is interposed between one of the side brackets 1i of the seat cushion 1 and the side bracket 2a of the seat back 2, and the second recliner device 7' is interposed between the other of the side brackets 1i of the seat cushion 1 and the side brackets 2a' of the seat back 2. The recliner devices 7, 7' serve as means to cause the seat back 2 to be releasably locked with respect to the seat cushion 1 and to allow an angle of the seat back 2 relative to the seat cushion 1 to be adjusted.

As shown in FIG. 3, spiral springs 8, 8 are stretched between the side brackets 1i of the seat cushion 1 and the side brackets 2a, 2a' of the seat back 2. The spiral springs 8, 8 always urge the seat cushion 1 and the seat back 2 in such a direction that they are drawn toward each other so as to be put together.

As shown in FIG. 3, the seat back 2 includes a substantially quadrilateral shaped seat back frame 20. The seat back frame 20 is provided with a vertically extending beam 21 bridged between an upper section of the seat back frame 20 and a lower section of the seat back frame 20, three spaced apart round rods 22a, 22b, 22c extending horizontally, and a supporting round rod 24 of a substantially L-shape provided between the uppermost rod 22a and one of both sides of the seat back frame 20 which is adjacent a center portion of the vehicle. Furthermore, a bracket plate 23 is arranged in close proximity to the one of the both sides of the seat back frame 20 and secured to the substantially L-shaped supporting rod 24, the vertically extending beam 21, and the lowermost rod 22c.

An operating lever 9 for releasing the striker locks 5a, 5b from the striker S is provided at the bracket plate 23 of the seat back frame 20. More particularly, the operating lever 9 is formed into a substantially L-shape as viewed from the side. The bracket plate 23 is formed with a substantially rectangle-shaped hole 23a and provided with a bearing plate 25 attached to a portion of the bracket plate 23 in which the substantially rectangle-shaped hole 23a is formed. The bearing plate 25 is formed with a hole 25a. The operating lever 9 is provided with a protrusion 9a. The operating lever 9 is received in the substantially rectangle-shaped hole 23a of the bracket plate 23 and pivotally supported to the bearing plate 25 with the protrusion 9a being received through the hole 25a and supported to the bearing plate 25 by a pin (not shown). The operating lever 9 is adapted to be handled by the user on the rear side of the seat back 2. The operating lever 9 is coupled to the striker locks 5a, 5b via a first traction cable 30 that is routed through a first cable conduit 30a. The first traction cable 30 consists of a bundle of fine metal wires. The first cable conduit 30a is made of resinous material. The first traction cable 30 is coupled at one end thereof to the protrusion 9a of the operating lever 9. One end of the first cable conduit 30a is supported to a retaining piece 26 that rises up from the bearing plate 25. The first cable 30 that extends from the operating lever 9 toward the striker locks 5a, 5b is branched into two sections on the way toward the striker locks 5a, 5b. The first cable conduit 30 is also branched into two sections through which the branched sections of the first cable 30 are routed. As will be discussed in greater detail hereinafter, ends of the branched sections of the first cable 30 are coupled to the striker locks 5a, 5b. When the operating lever 9 is operated by the user to thereby draw the cable 30, the striker locks 5a, 5b are allowed to be released or disengaged from the striker S.

As shown in FIG. 1, a traction strap 10 for causing the recliner devices 7, 7' to be unlocked is led rearward from the seat back 2. As shown in FIG. 3, the traction strap 10 is coupled at an end thereof to an actuating lever 100 that is turnably supported to the bracket plate 23 by a supporting pin 100a standing up from the bracket plate 23. A coil spring 100b is stretched between an edge of the bracket plate 23 and a middle portion of the actuating lever 100. The actuating lever 100 has first and second ends. The end of the traction strap 10 is coupled to the first end of the actuating lever 100 by a pin 100c. A tip end of the pin 100c is movably received in a circular arc-shaped elongate hole 23b that is formed in the bracket plate 23. The traction strap 10 extends upward from the actuating lever 100 and is led rearward from the seat back frame 20 through a corner plate 27 attached to an upper right-hand corner of the seat back frame 20. More particularly, the corner plate 27 includes a slot 27a formed therein, a pair of spaced apart protruding pieces 27c, 27c rising up from both edges of the slot 27a, and a strap receiver pin 27b supported to the protruding pieces 27c, 27c. The traction strap 10 extends over the strap receiver pin 27b from the actuating lever 100, passes through the slot 27a, and is led rearward from the seat back frame 20. The second end of the actuating lever 100 is coupled to the recliner devices 7, 7' via a second traction cable 15 that is routed through a second cable conduit 15a. Like the first traction cable 30, the second traction cable 15 consists of a bundle of fine metal wires. The second cable conduit 15a is also made of resinous material. The second traction cable 15 is coupled at one end thereof to the second end of the actuating lever 100. One end of the second cable conduit 15a is supported to a retaining portion 23c that is provided on the bracket plate 23. The second cable 15 that extends from the second end of the actuating lever 100 is branched into two sections 15d, 15e on the way. The first branched section 15d of the second cable 15 and the second branched section 15e of the second cable 15 extend toward the first recliner device 7 and the second recliner device 7', respectively, and are coupled to the first recliner device 7 and the second recliner device 7', respectively, as will be discussed in greater detail hereinafter. Also, the second cable conduit 15a is branched into two sections 15b, 15c through which the branched sections 15d, 15e of the second cable 15 are routed. Incidentally, the actuating lever 100 and the coil spring 100b are covered by a cover plate 28 from the front side of the seat back frame 20. When the traction strap 10 is pulled, the actuating lever 100 is turned about the supporting pin 100a so as to draw the second cable 15, whereby the recliner devices 7, 7' are unlocked.

As discussed above, the operating lever 9 and the actuating lever 100 are supported to the bracket plate 23 that is arranged in close proximity to the one of the both sides of the seat back frame 20 which is adjacent the center portion of the vehicle. Therefore, the operating lever 9 and the actuating lever 100 will not exert adverse effect on a seating feeling of an occupant having sat on the vehicle seat. In addition, the operating lever 9 and the actuating lever 100 are provided on the bracket plate 23 so as to be compactly arranged. Furthermore, the operating lever 9 and the traction strap 10 are disposed in proximity to each other on the rear side of the seat back 2, so that it is easy to handle the operating lever 9 and the traction strap 10 at a time.

Figure 4:
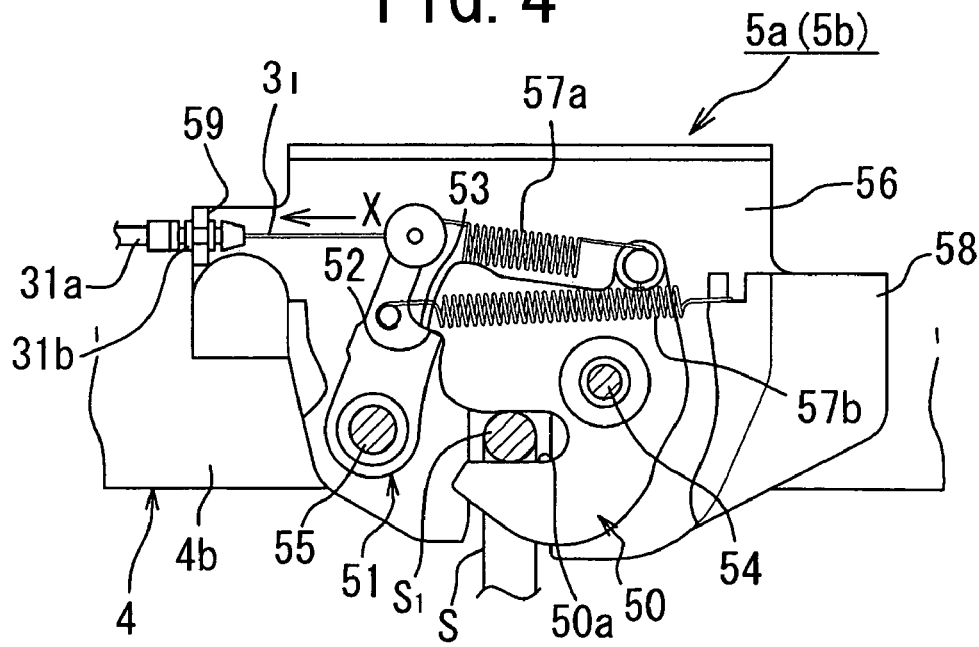
FIG. 4 is a schematic front elevational view of a striker lock with a cover frame thereof being partially cut away.

Referring to FIG. 4, each of the striker locks 5a, 5b comprises a base frame 56, a cover frame 58 combined with the base frame 56 in a face-to-face relation, a locking jaw 50 for catching an upper portion $S_1$ of the substantially inverted-U-shaped striker S, the locking jaw 50 being arranged between the base frame 56 and the cover frame 58, and a cam jaw 51 for allowing the locking jaw 50 to be kept in a striker-catching condition and allowing the locking jaw 50 to release the striker S therefrom, the cam jaw 51 being arranged between the base frame 56 and the cover frame 58. The locking jaw 50 has a receiving mouth 50a for receiving the upper portion $S_1$ of the striker S.

The locking jaw 50 is pivotally supported to a supporting pin 54 that penetrates the base frame 56 and the cover frame 58. Also, the cam jaw 51 is pivotally supported to a supporting pin 55 that penetrates the base frame 56 and the cover frame 58. The locking jaw 50 has an engaging protrusion edge 52. The cam jaw 51 has an engaging receiver edge 53. By engagement of the engaging receiver edge 53 of the cam jaw 51 with the engaging protrusion edge 52 of the locking jaw 50, the locking jaw 50 is kept in the striker-catching condition as shown in FIG. 4. By disengagement of the engaging receiver edge 53 of the cam jaw 51 from the engaging protrusion edge 52 of the locking jaw 50, the locking jaw 50 is allowed to release the striker S therefrom. Stretched between the locking jaw 50 and the cam jaw 51 is a coil spring 57a for always urging the locking jaw 50 in a counterclockwise direction in FIG. 4. Furthermore, a coil spring 57b is stretched between the cam jaw 51 and the cover frame 58, whereby the engaging receiver edge 53 of the cam jaw 51 is always engaged with the engaging protrusion edge 52 of the locking jaw 50.

An end portion 31 of corresponding one of the branched sections of the first traction cable 30 extending from the operating lever 9 (see FIG. 3) is coupled to an upper end of the cam jaw 51. One 31a of the branched sections of the first cable conduit 30a through which the one of the branched sections of the first traction cable 30 is routed has a conduit anchor 31b provided at an end thereof and is anchored via the conduit anchor 31b to a retainer piece 59 standing up from the base frame 56. When the operating lever 9 is operated by the user, the section 31 of the first traction cable 30 is drawn in such a direction as to be indicated in FIG. 4 by an arrow X, whereby the cam jaw 51 is pivoted about the supporting pin 55 against the action of the coil spring 57b so as to be disengaged from the locking jaw 50. Simultaneously with the pivotal movement of the cam jaw 51, the locking jaw 50 is pivoted in the counterclockwise direction about the supporting pin 54 due to the action of the coil spring 57a and is brought to a condition where an opening of the receiving mouth 50a of the locking jaw 50 faces downward. In this condition, when the entire vehicle seat is pivoted rearward around the supporting shafts 1h (FIG. 1), the locking jaw 50 is disengaged from the striker S.

Figure 5:
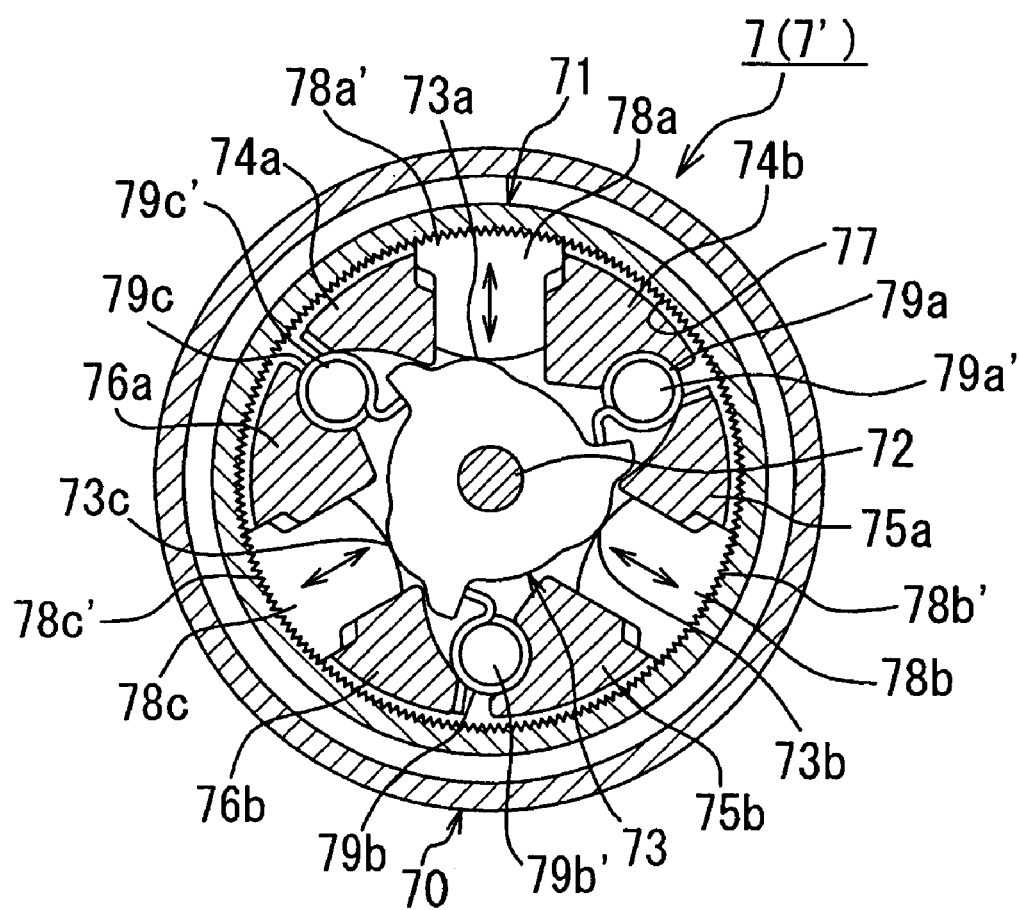
FIG. 5 is a schematic sectional view of a recliner device which is of assistance in explaining an internal structure of the recliner device.

As an example of each of the recliner devices 7, 7', there may be employed a conventional recliner device which is shown in FIG. 5 and disclosed in Japanese Patent Application laid open under Provisional Publication No. Hei. 8-253063. The recliner device includes a substantially cup-shaped stationary housing 70 secured to a corresponding side bracket of the seat cushion, a substantially cup-shaped movable cover 71 secured to a corresponding side bracket of the seat back and received in the stationary housing 70 in a face-to-face relation so as to rotatable relative to the stationary housing 70, an actuating shaft 72 penetrating through the stationary housing 70 and the movable cover 71, and a rotary cam 73 integrally mounted on the actuating shaft 72 for rotation therewith and arranged between the stationary housing 70 and the movable cover 71. As will be discussed in greater detail hereinafter, one of the branched sections of the second traction cable 15 discussed above is coupled to the actuating shaft 72 of corresponding one of the recliner devices 7, 7'.

The stationary housing 70 has three pairs of spaced apart bosses, namely, a first pair of spaced apart bosses 74a, 74b, a second pair of spaced apart bosses 75a, 75b and a third pair of spaced apart bosses 76a, 76b, which are provided on an inner surface of the stationary housing 70. The movable cover 71 has gear teeth 77 formed around an inner peripheral surface thereof. A first locking gear 78a, a second locking gear 78b and a third locking gear 78c are slidably arranged between the first pair of the bosses 74a, 74b, the second pair of the bosses 75a, 75b, and the third pair of the bosses 76a, 76b, respectively. The first, second and third locking gears 78a, 78b, 78c have toothed portions 78a', 78b', 78c' that are operatively engaged with the gear teeth 77 of the movable cover 71. Each of the locking gears is radially movable between a locked position in which the toothed portion of the locking gear is meshed with the gear teeth 77 of the movable cover 71, and an unlocked position in which the toothed portion of the locking gear is disengaged from the gear teeth 77 of the movable cover 71. The rotary cam 73 has three protruding edge regions 73a, 73b, 73c. The locking gears are always urged by return springs (not shown) in such a direction as to be disengaged from the gear teeth 77 of the movable cover 71, and abutted against the protruding edge regions 73a, 73b, 73c of the rotary cam 73 by the return springs.

The housing 70 further has three supporting pins 79a', 79b', 79c' standing up from the inner surface thereof. Three springs 79a, 79b, 79c are provided between the supporting pins 79a', 79b', 79c' and the rotary cam 73, whereby the rotary cam 73 is always urged in such a direction as to cause the locking gears 78a, 78b, 78c to be meshed with the gear teeth 77 of the movable cover 71 against the actions of the unshown return springs. When the second traction cable 15 is drawn by the traction strap 10 (FIG. 3) and the rotary cam 73 integrally mounted on the actuating shaft 72 is rotated in the opposite direction to the direction in which the rotary cam 73 is urged by the springs 79a, 79b, 79c, the locking gears 78a, 78b, 78c are disengaged from the gear teeth 77 of the movable cover 71 due to the actions of the unshown return springs. Thus, the recliner devices are brought to unlocked conditions. In these conditions, the seat cushion 1 and the seat back 2 are drawn toward each other due to the actions of the spiral springs 8 (see FIG. 1).

As shown in FIG. 2, the linkage means 12 is provided between the second cross beam 1d and the rear frame section 1b of the seat cushion frame. The linkage means 12 includes a base frame 13a and a cover frame 13b combined with the base frame 13a.

Figure 6:
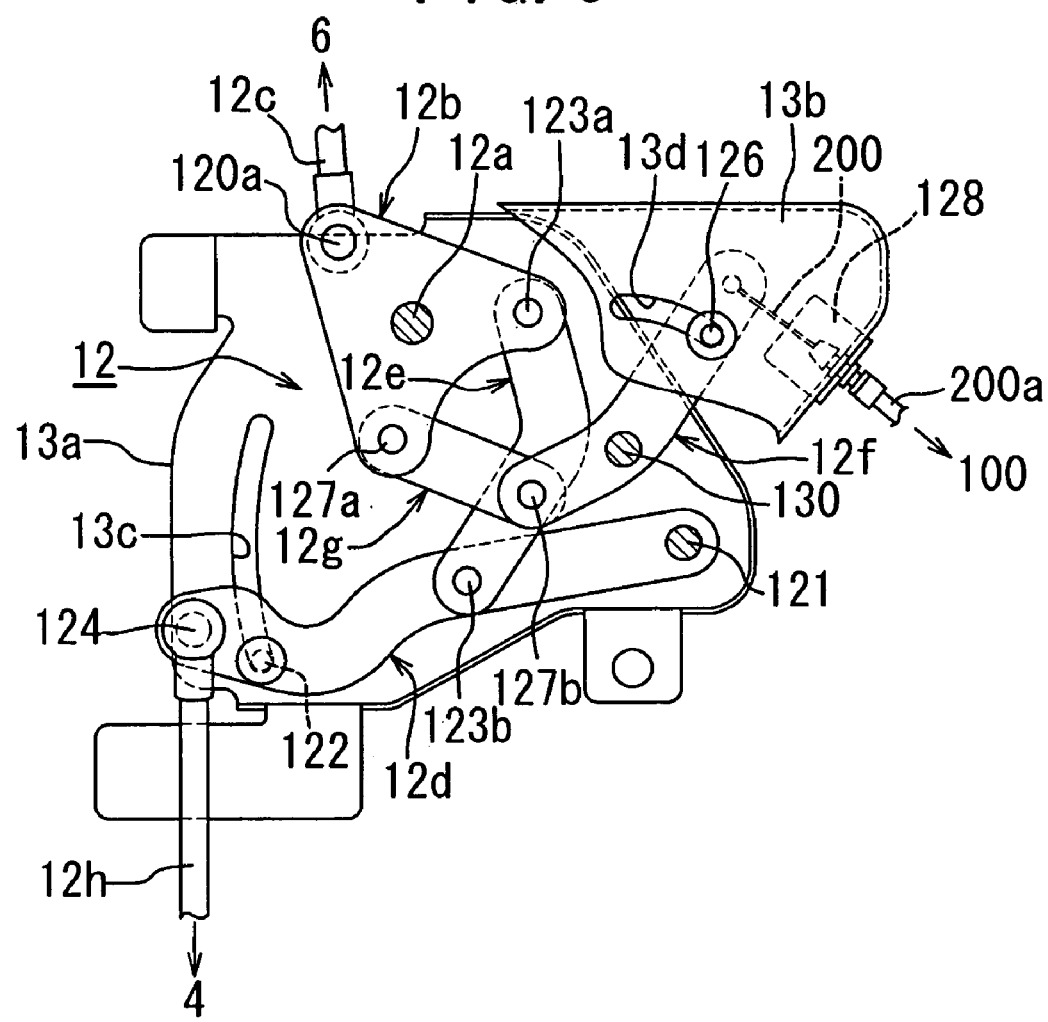
FIG. 6 is a schematic plan view of a linkage means with a cover frame thereof being partially cut away.

Referring now to FIG. 6, the linkage means 12 further includes a turnable plate 12b arranged between the base frame 13a and the cover frame 13b, the seat leg means-driving linkage section arranged between the base frame 13a and the cover frame 13b, and the recliner device-driving linkage section arranged between the base frame 13a and the cover frame 13b. The turnable plate 12b is supported to a rotating pin 12a for rotation therewith. The rotating pin 12a is rotatably supported to the base frame 13a and extends vertically so as to penetrate through the cover frame 13b. In the illustrated example, the turnable plate 12b is formed into a substantially triangular shape in outline which has three lobes. However, the shape of the turnable plate 12b is not limited to a triangular shape inasmuch as components of the linkage means that will be discussed hereinafter can be coupled to peripheral regions of the turnable plate 12b so as to be spaced apart from one another.

The turnable plate 12b is coupled at a first lobe thereof to one of the base brackets 6 (see FIG. 1) via a main driving rod 12c. More particularly, the main driving rod 12c is coupled at one end thereof to the first lobe of the turnable plate 12b by a first pivot 120a and is coupled at the other end thereof to the base bracket 6 by a second pivot 120b (see FIG. 1). Thus, when the entire seat vehicle is pivoted forward and rearward about the supporting shafts 1h, the turnable plate 12b is turned together with the rotating pin 12a relative to the base frame 13a and the cover frame 13b. Therefore, the main driving rod 12c has a length enough to allow the turnable plate 12b to be turned by a predetermined stroke.

The seat leg means-driving linkage section of the linkage means 12 comprises a first swinging bar 12d and a first connecting bar 12e. The recliner device-driving linkage section of the linkage means 12 comprises a second swinging bar 12f and a second connecting bar 12g.

The first swinging bar 12d of the seat leg means-driving linkage section is located at a position adjacent the front section of the seat cushion 1 and extends laterally. The first swinging bar 12d is turnably supported at one end thereof to a supporting pin 121 that is provided between the base frame 13a and the cover frame 13b so as to vertically extend. The first swinging bar 12d has a guide pin 122 provided at a portion thereof which is adjacent the other end of the first swinging bar 12d, and projecting downward from the first swinging bar 12d. The guide pin 122 of the first swinging bar 12d is movably received in a circular arc-shaped elongate hole 13c that is formed in the base frame 13a and extends in such a direction as to cross the first swinging bar 12d. Thus, the first swinging bar 12d is turnable around the supporting pin 121 while being guided along the elongate hole 13c through the guide pin 122.

The first connecting bar 12e of the seat leg means-driving section is coupled to the turnable plate 12b and the first swinging bar 12d. More particularly, the first connecting bar 12e is coupled at one end thereof to a second lobe of the turnable plate 12b by a supporting pin 123a and coupled at the other end thereof to a middle portion of the first swinging bar 12d by a supporting pin 123b.

The first swinging rod 12d is further coupled to the seat leg means 4 via a driven rod 12h. More particularly, the driven rod 12h is coupled at one end portion thereof to the other end of the first swinging rod 12d by a pivot 124 and coupled at the other end portion thereof to the seat leg body via a bearing sleeve 125 as shown in FIG. 1.

Figure 7:
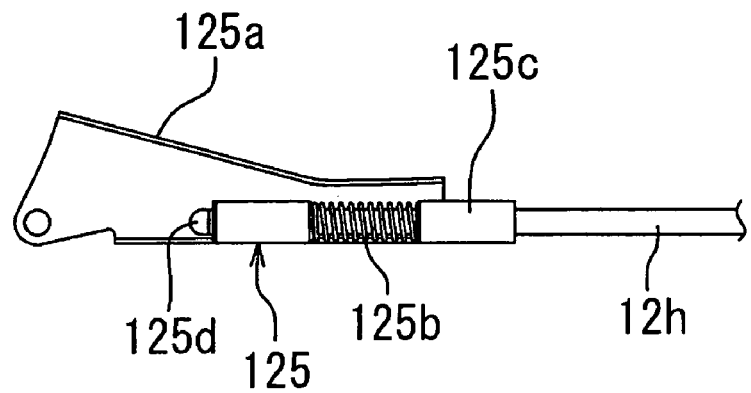
FIG. 7 is a schematic side elevational view of a sleeve structure to which a driven rod of the linkage means is coupled.

Referring now to FIG. 7, the bearing sleeve 125 is mounted to a plate 125a attached to the leg body. The other end portion of the driven rod 12h is inserted through the bearing sleeve 125. The other end portion of the driven rod 12h has a stopper collar 125d provided at a tip thereof that projects from the bearing sleeve 125, and a circumferential flange 125c. A coil spring 125b is mounted around a portion of the driven rod 12h between the bearing sleeve 125 and the circumferential flange 125c of the driven rod 12h. This bearing sleeve arrangement ensures that a jarring effect of the linkage means 12 is positively prevented and errors that may be produced on assembling of the linkage means 12 to the seat cushion frame are cancelled. Furthermore, the bearing sleeve arrangement is designed so as to ensure that the seat leg means is returned to the use position before the striker locks 5a, 5b are engaged with the striker S when the entire vehicle seat is pivoted forward from the stored position. Therefore, the bearing sleeve arrangement can positively absorb an over-stroke of the seat leg means that may occur when the entire vehicle seat is pivoted forward, so that the linkage means 12 can be prevented from being damaged.

When the entire vehicle seat is pivoted forward from the stored position or pivoted toward the seating position from the stored position, the main driving rod 12c is drawn so as to cause the turnable plate 12b to be turned in a direction. The turning of the turnable plate 12b causes the seat leg means-driving linkage section to be actuated, whereby the driven rod 12h is pushed forward, with the result that the seat leg means 4 is brought to the use position. Conversely, when the entire vehicle seat is pivoted toward the stored position from the seating position, the main driving rod 12c is pushed so as to cause the turnable plate 12b to be turned in a reverse direction. The turning of the turnable plate 12b in the reverse direction causes the seat leg means-driving linkage section to be actuated, whereby the driven rod 12h is pulled rearward, with the result that the seat leg means 4 is brought to the non-use position in which the seat leg means 4 is folded so as to lie flat against the bottom surface of the seat cushion 1. Thus, synchronously with pivotal movement of the vehicle seat, the seat leg means can be positively brought to the use position or the non-use position.

Again referring to FIG. 6, the second swinging bar 12f of the recliner device-driving section is obliquely arranged and extends toward a rearward portion of the base frame 13a from a portion of the base frame 13a that is adjacent a forward portion of the base frame 13a. The second swinging bar 12f is pivotally supported at a substantially middle portion thereof to a supporting pin 130 that is provided between the base frame 13a and the cover frame 13b and extends vertically. The second swinging bar 12f has a second guide pin 126 provided at a portion thereof that is adjacent one end of the second swinging bar 12f. The second guide pin 126 projects upward from the second swinging bar 12f. The cover frame 13b is formed with a second circular arc-shaped elongate hole 13d. The second guide pin 126 of the second swinging bar 12f is movably received in the second circular arc-shaped elongate hole 13d of the cover frame 126. Thus, the second swinging bar 12f can be turned about the supporting pin 130 while being guided along the second circular arc-shaped elongate hole 13d through the second guide pin 126.

The second connecting bar 12g of the recliner device-driving linkage section is coupled to the turnable plate 12b and the second swinging bar 12f. More particularly, the second connecting bar 12g is coupled at one end thereof to a third lobe of the turnable plate 12b via a supporting pin 127a and coupled at the other end thereof to the other end of the second swinging bar 12f via a supporting pin 127b.

The second swinging bar 12f is coupled via a third traction cable 200 to the end of the actuating lever 100 to which the second cable 15 is coupled as shown in FIG. 3. More particularly, one end of the third cable 200 is coupled to the one end of the second swinging bar 12f and the other end of the third cable 200 is coupled to the end of the actuating lever 100 to which the second cable 15 is coupled as shown in FIG. 3. Like the first and second cables, the third cable 200 consists of a bundle of fine metal wires and routed through a third cable conduit 200a that is made of resinous material. One end of the third cable conduit 200a is fixed to a retainer 128 provided on an inner surface of the cover frame 13b. The other end of the third cable conduit 200a is fixed to the bracket plate 23 shown in FIG. 3. Thus, the second swinging bar 12f is coupled to the recliner devices through the actuating lever 100 and the second and third cables 15, 200.

As the entire vehicle seat is pivoted rearward, the second swinging bar 12f and the second connecting bar 12g of the recliner device-driving linkage section are adapted to reciprocate whereas the first swinging bar 12d and the first connecting bar 12e of the seat leg means-driving linkage section are driven by a one-way stroke. Such reciprocating motion of the bars 12f, 12g is realized because the first swinging bar 12d is longer than the second swinging bar 12f and pivotally supported at the end thereof to the supporting pin 121, whereas the second swinging bar 12f is relatively short and is pivotally supported at the substantially middle portion thereof to the supporting pin 130.

Figure 8:
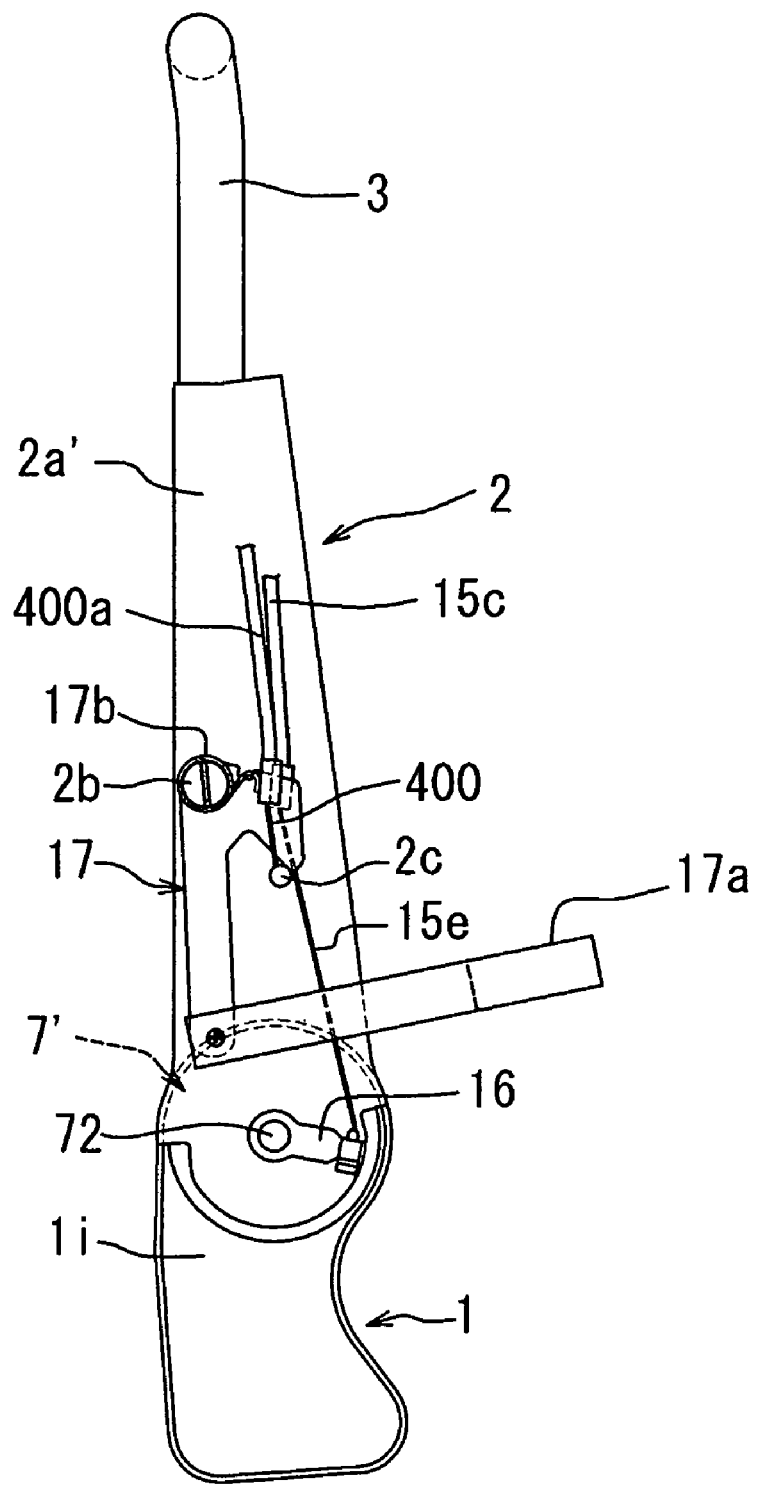
FIG. 8 is a schematic side elevational view of the seat back frame.

Again referring to FIG. 3 and referring now to FIG. 8, the branched sections 15d, 15e of the second cable 15 extending from the actuating lever 100 are coupled to the recliner devices (only the branched section 15e of the second cable 15 and only the recliner device 7' are shown in FIG. 8). More particularly, end portions of the branched sections 15d, 15e of the second cable 15 that are led out of the branched sections 15b, 15c of the second cable conduit 15a are coupled to projecting pieces 16 that are mounted on the actuating shafts 72 of the recliner devices 7, 7' (only the branched section 15c of the second cable conduit 15a and only the projecting piece 16 mounted on the actuating shaft 72 of the recliner device 7' are shown in FIG. 8).

As shown in FIG. 8, a second operating lever 17 is pivotally supported to the side bracket 2a' of the seat back 2 along which the branched section 15e of the second cable 15 extends. The branched section 15c of the second cable conduit 15a through which the branched section 15e of the second cable 15 is routed is retained at an end of the branched section 15c to the second operating lever 17. Though not shown, the branched section 15b of the second cable conduit 15a is fixed at an end thereof to the side bracket 2a of the seat back 2.

The second operating lever 17 is handled mainly in a case where the occupant having sat on the vehicle seat intends to adjust an angle of the seat back 2 relative to the seat cushion 1. The second operating lever 17 has a substantially L-shaped body which comprises a vertically extending portion and a horizontally extending portion. The second operating lever 17 is pivotally supported at the horizontally extending portion thereof to the side bracket 2a' of the seat back 2 by a supporting pin 2b. A return coil spring 17b is mounted around the supporting pin 2b and retained at an end thereof to an upper portion of the horizontally extending portion of the second operating lever 17, whereby the second operating lever 17 is always urged in a clockwise direction by the return coil spring 17b in FIG. 8. Furthermore, a stopper pin 2c for restricting a return position of the second operating lever 17 is provided at the side bracket 2a' of the seat back 2. The second operating lever 17 is abutted at a lower edge of the horizontally extending portion against the stopper pin 2c. Attached to a lower end of the vertically extending portion of the second operating lever 17 is a second traction strap 17a which is to be handled by the occupant. A fourth traction cable 400 that is routed through a fourth cable conduit 400a is coupled at one end thereof to the stopper pin 2c. As shown in FIG. 3, the fourth traction cable 400 that is routed through the fourth cable conduit 400a extends toward the first branched section 15b of the second traction cable 15 from the stopper pin 2c, and joined to the first branched section 15b of the second traction cable 15 through a joint 400b that is secured to the side bracket 2a of the seat back frame. The fourth cable conduit 400a is fixed at one end thereof to the second operating lever 17 as shown in FIG. 8. The fourth traction cable 400 is constructed in the same manner as the first and second traction cables are done. Also, the fourth cable conduit 400a is formed of resinous material.

Again referring to FIGS. 5 and 8, the operation of the recliner devices 7, 7' that is carried out by pulling the second traction strap 17a will be discussed hereinafter. When the occupant pulls the traction strap 17a against the action of the return coil spring 17b in order to adjust the angle of the seat back 2 relative to the seat cushion 1, the second operating lever 17 is pivoted while causing the actuating shaft 72 of the second recliner device 7' to be rotated. Simultaneously with the pivotal movement of the second operating lever 17, the fourth cable conduit 400a and the second cable conduit section 15c are moved relative to the fourth cable 400 and the cable section 15e, whereby the sections 15d, 15e of the second traction cable 15 are pulled and the actuating shafts 72 of the first and second recliner devices 7, 7' are rotated. When the actuating shafts 72 of the recliner devices 7, 7' are rotated, the rotary cams 73 of the recliner devices 7, 7' are simultaneously rotated so as to allow the locking gears 78a-78c of the recliner devices 7, 7' to be disengaged from the toothed surfaces 77 of the movable covers 71 mounted on the side brackets 2a, 2a' of the seat back 2. As a result, the seat back 2 is brought to a condition where the seat back 2 is allowed to be rotated relative to the seat cushion 1. In this condition, the occupant can adjust the angle of the seat back relative to the seat cushion. When the second traction strap 17a is released from the occupant, the locking gears 78a-78c of the recliner devices 7, 7' are returned to their original positions due to the actions of the return coil springs 79a-79c and meshed with the toothed surfaces 77 of the movable covers 71 of the recliner devices 7, 7'. Thus, the seat back 2 is again locked with respect to the seat cushion 1.

When the entire vehicle seat is pivoted toward the stored position from the seating position, the linkage means 12 is actuated, whereby the recliner devices 7, 7' are unlocked and the seat back 2 is released from the seat cushion 1. As soon as the seat back 2 is released from the seat cushion 1, the spiral springs 8 (FIGS. 1 and 3) are contracted so as to be further wound up, with the result that the seat cushion 1 and the seat back 2 are rapidly moved toward each other. In order to prevent such a rapid movement of the seat cushion 1 and the seat back 2 toward each other, a damper means 18 (see FIG. 1) for decelerating the rapid movement of the seat cushion 1 and the seat back 2 toward each other may be employed. The damper means 18 also serves as means to decelerate the pivotal movement of the entire vehicle seat.

Referring now to FIGS. 9 and 10, the damper means 18 is supported to an upper end portion of the rotating pin 12a supporting the turnable plate 12b of the linkage means 12. The upper end portion of the rotating pin 12a penetrates through the cover frame 13b of the linkage means 12 and projects upward. The damper means 18 comprises a substantially cap-shaped body 18a having a substantially dome-shaped section 180 and a flange section 181 projecting laterally from the substantially dome-shaped section 180, a bottom plate 18b mounted in a bottom portion of the substantially dome-shaped section 180, and a rotary element 18c.

The upper end portion of the rotating pin 12a supporting the turnable plate 12b of the linkage means 12 is knurled. The rotary element 18c comprises a cylindrical boss section 185 for receiving the knurled upper end portion of the rotating pin 12a, a circumferential flange section 186 projecting radially from a substantially middle portion of the boss section 185, and a plurality of first ring-shaped fins 187 rising up from an upper surface of the flange section 186 and coaxial with the boss section 185, and a second ring-shaped fin 188 projecting downward from a lower surface of the flange section 186 and coaxial with the boss section 185. An inner surface of the substantially dome-shaped section 180 is formed with a substantially cylindrical-shaped recess portion 180a for receiving the boss section 185 of the rotary element 18c, and a plurality of ring-shaped grooves 183 that correspond in number to the first ring-shaped fins 187. The bottom plate 18b has a central through-hole 180b through which the boss section 185 of the rotary element 18c is inserted, and a ring-shaped groove 184 formed in an upper surface of the bottom plate 18b. The rotary element 18c is combined with the dome-shaped section 180 and the bottom plate 18b so as to be rotatable relative to the dome-shaped section 180 and the bottom plate 18b, with the boss section 185 penetrating the through-hole 180b of the bottom plate 18b and being received in the recess portion 180a of the dome-shaped section 180, with the first fins 187 being received in the grooves 183 of the dome-shaped section 180, and with the second fin 188 being received in the groove 184 of the bottom plate 18b. The flange section 181 of the substantially cap-shaped body 18a has a circular arc-shaped elongate groove 189 formed in a bottom surface thereof. A stopper pin 13e is attached to the cover frame 13b of the linkage means 12 so as to rise up from the upper surface of the cover frame 13b. The groove 189 of the flange section 181 of the substantially cap-shaped body 18a receives the stopper pin 13e of the cover frame 13b. The substantially cap-shaped body 18a and the bottom plate 18b are formed of resin material. The rotary element 18c is formed of lubricous resin material. Any suitable viscous oil is applied onto the inner surface of the dome-shaped section 180, the through-hole 180b and the groove 184 of the bottom plate 18b. Therefore, when the rotary element 18c is rotated with the rotating pin 12a, the speed of the rotation of the rotary element 18c is reduced due to the resistance of the viscous oil, resulting in the speed of the rotation of the rotating pin 12a being also reduced.

The damper means 18 is designed such that the rotary element 18c begins to be rotated with a time-lag behind the beginning of the rotation of the rotating pin 12a. More particularly, as shown in FIG. 10, the groove 189 of the flange section 181 of the damper means 18 is formed into a substantially circular arc-shape so as to be coaxial with the rotating shaft 12a. When the rotating pin 12a starts to be rotated, the entire damper means 18 is turned while being guided by the stopper pin 13e. When an end of the groove 189 of the flange section 181 is abutted against the stopper pin 13e of the cover frame 13b of the linkage means 12 during the rotation of the entire damper means 18, the rotary element 18c only starts to be rotated relative to the substantially cap-shaped body 18a and the bottom plate 18b.

The vehicle seat constructed as discussed above is adapted to be manually pivoted rearward and forward about the supporting shafts 1h by the user. In order to facilitate the rearward and forward pivotal movement of the vehicle seat by the user, the vehicle seat according to the present invention further includes a pull pocket structure into which the user can insert a user's hand when the user intends to cause the vehicle seat to be pivoted rearward and forward. The pull pocket structure may be provided at, for example, a third cross beam (not shown) that is bridged between the both sides of the seat cushion frame. However, in the case where the pull pocket structure is provided at such a third cross beam, a portion of a cushioned padding of the seat cushion 1 which positionally corresponds to the pull pocket structure is inevitably forced to be thinned. This will deteriorate an occupant's seating feeling. In order to overcome this problem, in the illustrated embodiment according to the present invention, the pull pocket structure is attached to a portion of the seat cushion frame that does not exert adverse effect on the occupant's seating feeling.

Again referring to FIGS. 1 and 2 and referring to FIGS. 11 to 13, the pull pocket structure 19 will be discussed hereinafter. As shown in FIGS. 1 and 2, the pull pocket structure 19 is attached to an approximately middle portion of a front section 1*j* of the seat cushion frame.

Figure 11:
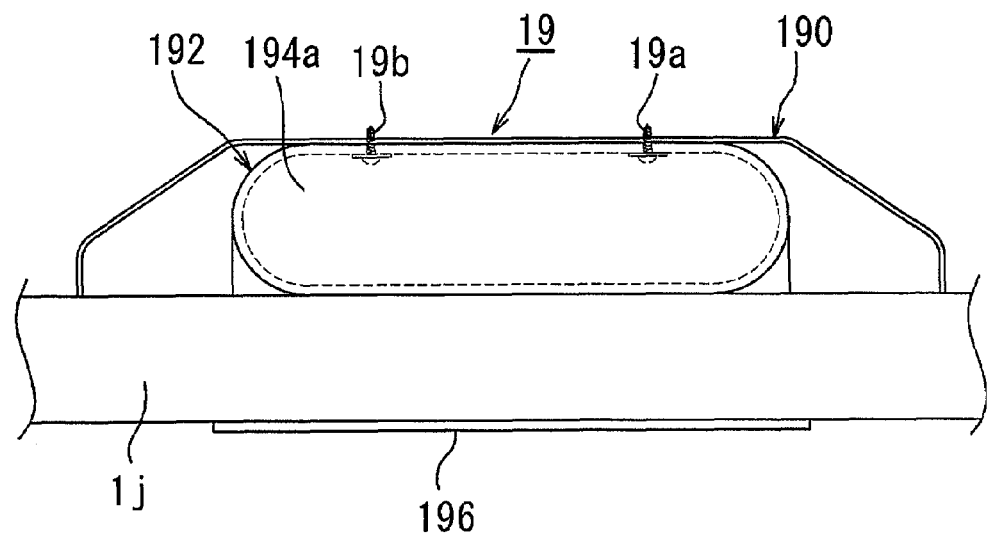
FIG. 11 is a schematic front elevational view of a pull pocket structure.

As shown in FIG. 11, the pull pocket structure 19 comprises a substantially belt-shaped support member 190 that is formed into a substantially trapezoidal shape as viewed from the front side, and a pull pocket 192 attached to the support member 190. The belt-shaped support member 190 is fixed at both ends thereof to an upper surface of the approximately middle portion of the front section 1*j* of the seat cushion frame by, for example, welding.

Figure 12:
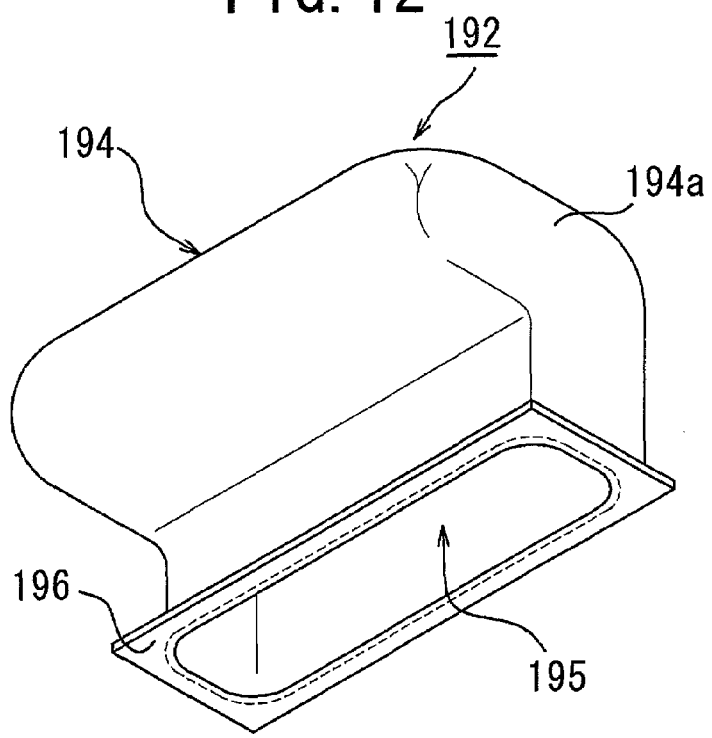
FIG. 12 is a schematic perspective view of a pull pocket body of the pull pocket structure.

As shown in FIG. 12, the pull pocket 192 comprises a pull pocket body 194 formed into a substantially L-shape in outline. The pull pocket body 194 includes a hollow section 195 having a shape corresponding to that of the pull pocket body 194. The hollow section 195 has dimensions enough to allow the user to insert the user's hand into the hollow section 195. A flange section 196 is formed integrally with a peripheral edge of an opening of the hollow section 195. As shown in FIG. 11, the pocket body 194 is attached to the support member 190 with a horizontal portion 194*a* of the substantially L-shaped pocket body 194 being disposed between the belt-shaped support member 190 and the upper surface of the front section 1*j* of the seat cushion frame, with a portion of the flange section 196 being engaged with a lower surface of the front section 1*j* of the seat cushion frame, and with the horizontal portion 194*a* of the substantially L-shaped pull pocket body 194 being secured to the support member 190 by screws 19*a*, 19*b*.

Figure 13:
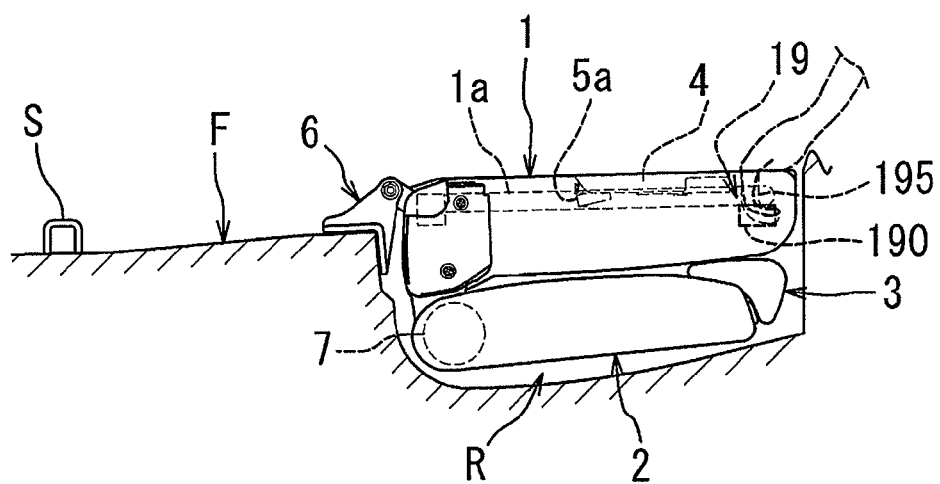
FIG. 13 is a schematic elevational side view of the vehicle seat in which the vehicle seat is in a stored state and which is of assistance in explaining that a user causes the vehicle seat to be pivoted while inserting a user's hand into a hollow section of the pull pocket structure and lifting the vehicle seat up.

The user inserts the user's hand into the hollow section 195 of the pull pocket body as shown in FIG. 13 and can then cause the vehicle seat within the storage recess R of the vehicle floor F to be pivoted forward while lifting the vehicle seat up by the user's hand. Similarly, when the entire vehicle seat is to be pivoted from the seating position to the stored position, the user inserts the user's hand into the hollow section 195 of the pull pocket body 194 and can cause the entire vehicle seat to be pivoted toward the stored position.

As discussed above, the pull pocket structure 19 is attached to the approximately middle portion of the front section 1*j* of the seat cushion frame. A portion of a cushioned padding (not shown) of the seat cushion that positionally corresponds to the approximately middle portion of the front section 1*j* to which the pull pocket structure 19 is attached is inevitably forced to be thinned. However, the portion of the cushioned padding positionally corresponds to a space between the femora of the occupant having sat on the vehicle seat, so that the pull pocket structure 19 attached to the approximately middle portion of the front section 1*j* of the seat cushion frame will not exert adverse effect on the occupant's seating feeling. Incidentally, portions of the cushioned padding that support the femora of the occupant can be thickened.

While the pull pocket structure 19 is attached to the seat cushion frame of the seat cushion in the illustrated example, it may be attached to any suitable portion of the seat back frame of the seat back which does not exert adverse effect on the occupant's seating feeling.

Figure 14A:
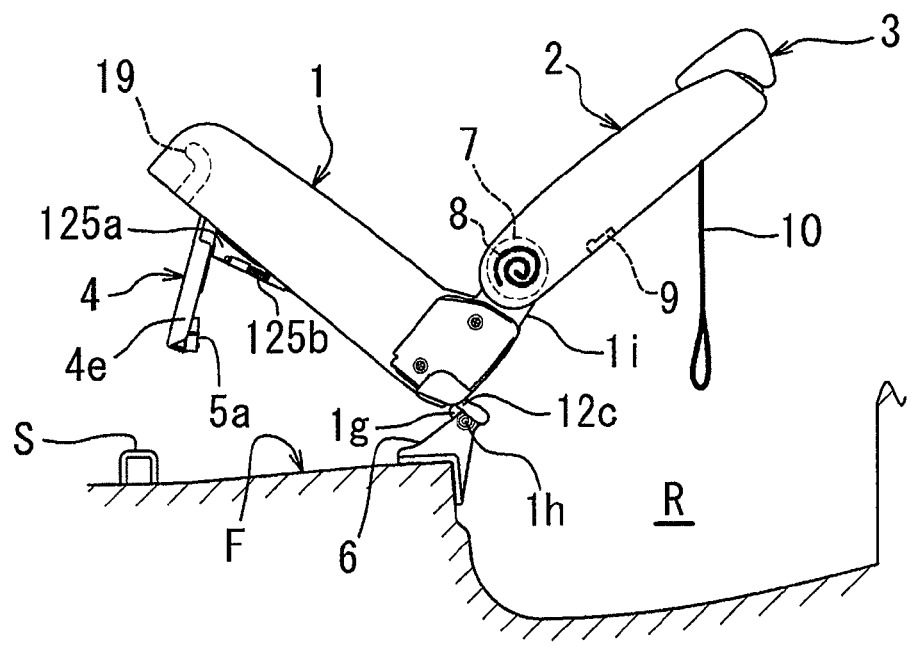
FIGS. 14a-16c are each a schematic view which is of assistance in explaining pivotal movement of the vehicle seat from its seating position toward its stored position.

Referring now to FIGS. 14*a* to 16*c*, the pivotal movement of the vehicle seat toward the stored position from the seating position will be discussed in detail hereinafter. First of all, the user pushes down the head rest 3 relative to the seat back 2 until the head rest 3 is abutted against an upper surface of the seat back 2. Then, the user pulls the first operating lever 9 to thereby cause the striker locks 5*a*, 5*b* to be disengaged from the striker S. Furthermore, the user causes the vehicle seat to be slightly pivoted rearward so as to cause the striker locks 5*a*, 5*b* to be separated from the striker S as shown in FIG. 14*a*, while inserting the user's hand into the hollow section of the pull pocket structure 19.

As the vehicle seat is pivoted rearward, the linkage means 12 begins to be actuated. More particularly, the turnable plate 12*b* of the linkage means 12 is initially pushed in such a direction as to be indicated in FIG. 14*b* by an arrow A by the main driving rod 12*c* that is coupled to the base bracket 6. Then, the turnable plate 12*b* is turned with the rotating pin 12*a* in such a direction as to be indicated in FIG. 14*b* by an arrow B. The turning of the turnable plate 12*b* in the direction B causes the first connecting rod 12*e* coupled to the turnable plate 12*b* to be moved in such a direction as to be indicated in FIG. 14*b* by an arrow C. Simultaneously with such a movement of the first connecting rod 12*e*, the first swinging bar 12*d* begins to be swung around the supporting pin 121 in such a direction as to be indicated in FIG. 14*b* by an arrow D, while being guided along the circular arc-shaped elongate hole 13*c* of the base frame 12*b* through the guide pin 122. The driven rod 12*h* is coupled to the first swinging bar 12*d* as discussed above, so that such a movement of the first swinging bar 12*d* draws the driven rod 12*h* in such a direction as to be indicated in FIG. 14*b* by an arrow E, whereby the seat leg means 4 coupled to the driven rod 12*h* begins to be folded.

Figure 14B:
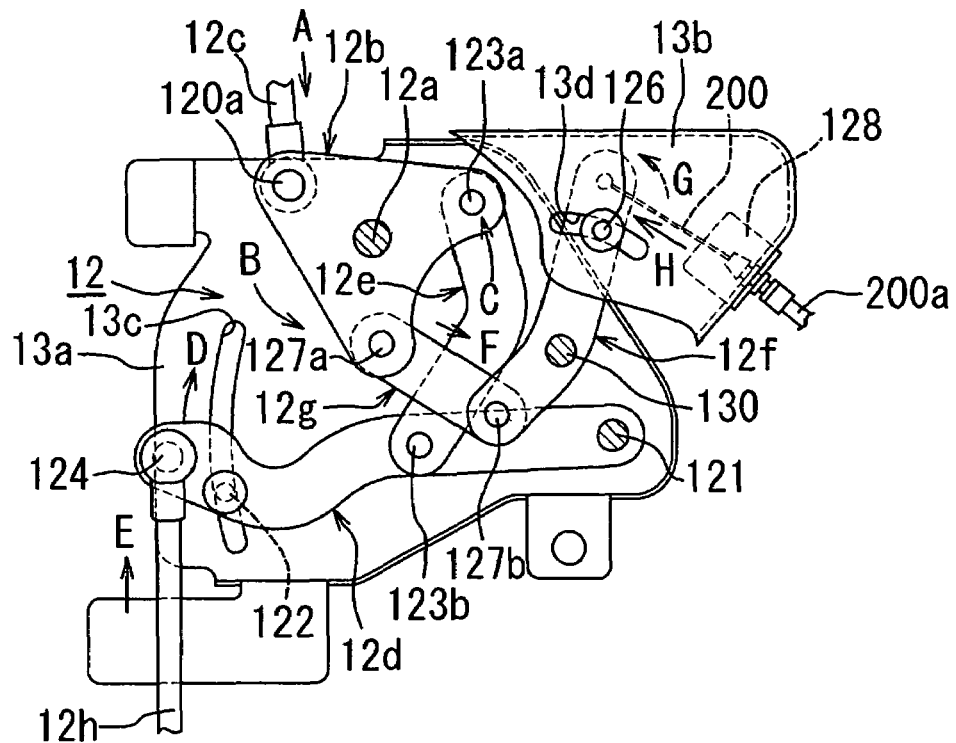
Figure 14C:
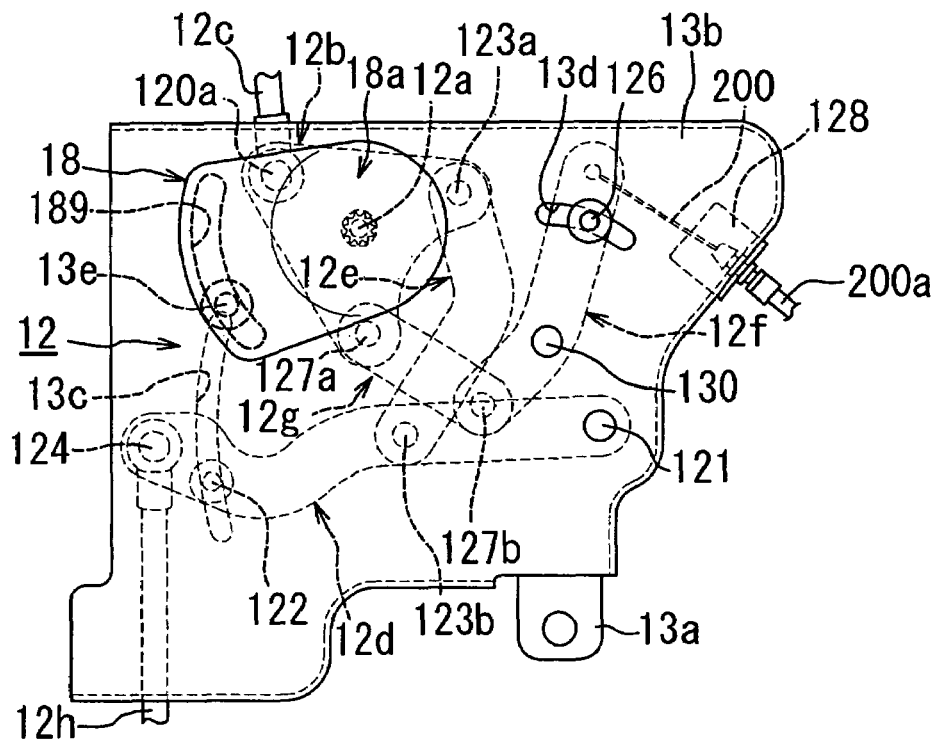

As the turnable plate 12*b* is turned in the direction B, the second connecting bar 12*g* coupled to the turnable plate 12*b* pushes the second swinging bar 12*f* in such a direction as to be indicated in FIG. 14*b* by an arrow F. When the second swinging bar 12*f* is pushed in the direction F by the second connecting bar 12*g*, the second swinging bar 12*f* is swung around the supporting pin 130 in such a direction as to be indicated in FIG. 14*b* by an arrow G, whereby the third traction cable 200 that is coupled to the second swinging bar 12*f* is drawn in such a direction as to be indicated in FIG. 14*b* by an arrow H. When the third traction cable 200 is drawn, the actuating lever 100 (see FIG. 3) to which the third traction cable 200 is coupled is pulled downward, whereby the actuating shafts 72 of the recliner devices 7, 7' (see FIG. 3) are rotated and the recliner devices are brought to the unlocked conditions. At the initial actuation stage of the linkage means 12, the entire damper means 18 is rotated by the rotating pin 12*a* of the linkage means 12 but the end of the circular arc-shaped groove 189 of the damper means is not abutted against the stopper pin 13*e* of the cover frame 13*b* of the linkage means 12 as shown in FIG. 14*c*. Therefore, at this time, the damper means 18 does not perform deceleration function yet.

Figure 15A:
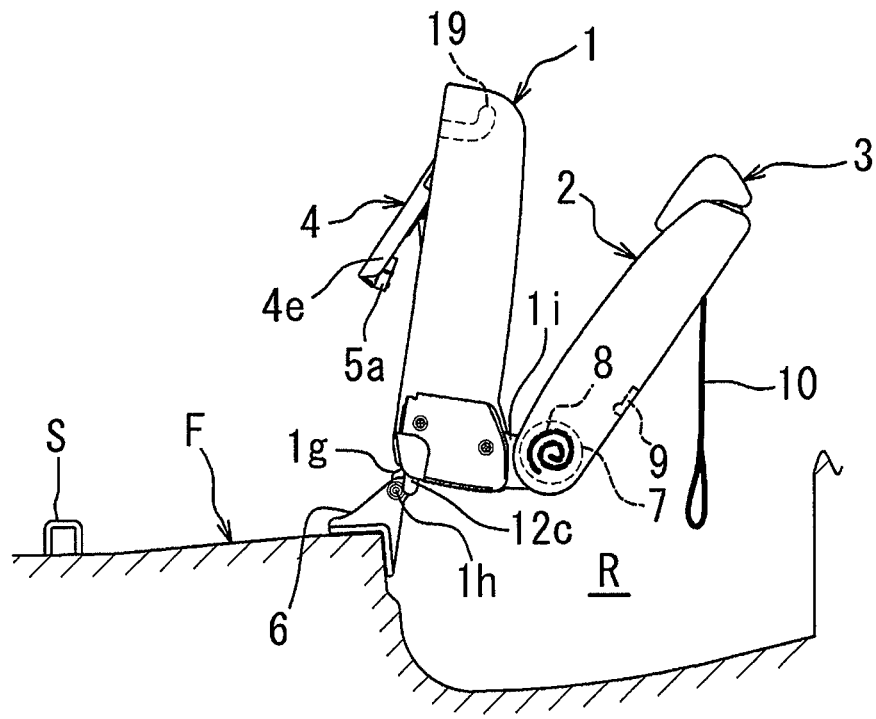
Figure 15B:
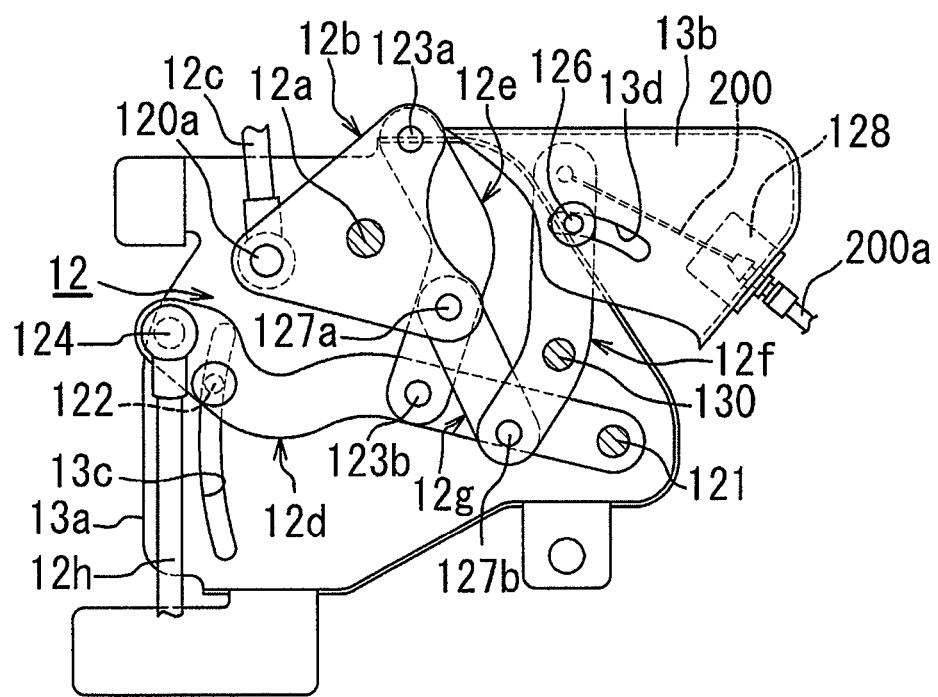
Figure 15C:
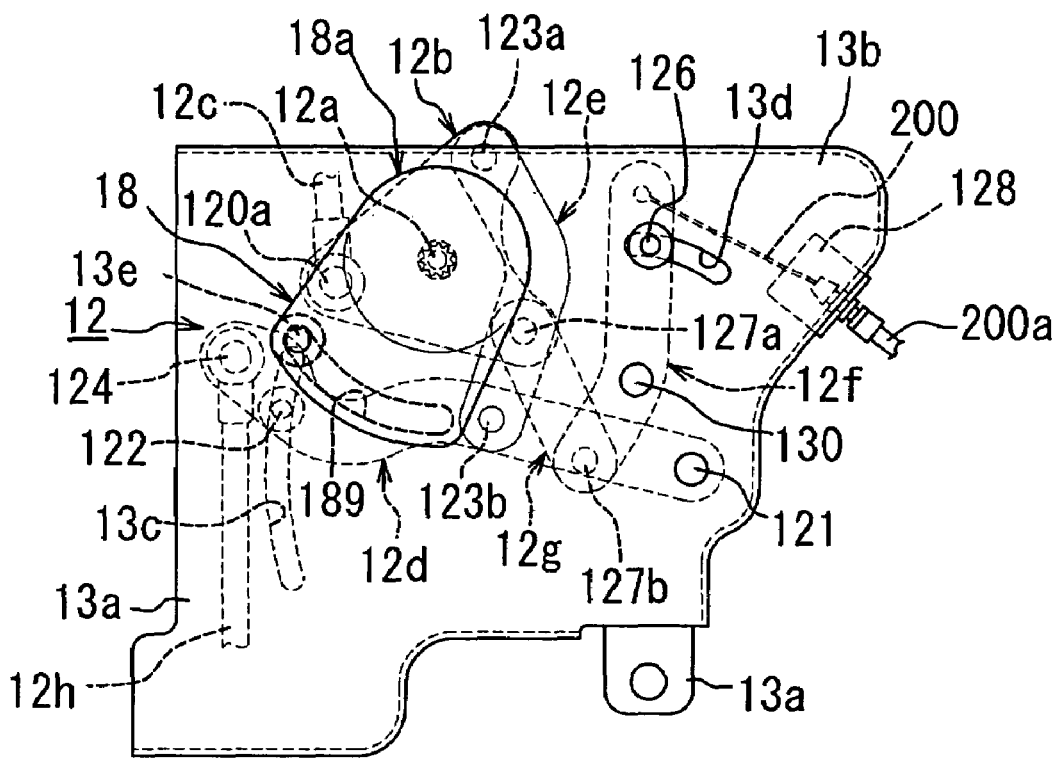

When the recliner devices 7, 7' are unlocked, the spiral springs 8 are elastically contracted so as to be further wound up, whereby the seat cushion 1 is drawn toward the seat back 2 as shown in FIG. 15*a*. As the seat cushion 1 is drawn toward the seat back 2, the turnable plate 12*b* is further pushed by the main driving rod 12*c* and further turned in the direction B (FIG. 14*b*) as shown in FIG. 15*b*, whereby the driven rod 12*h* coupled to the seat leg means 4 is further drawn in the direction E (FIG. 14*b*) by the first swinging bar 12*d*. As a result, the seat leg means 4 is further folded. As the seat cushion 1 is further drawn toward the seat back 2 by the spiral springs 8, the end of the circular arc-shaped groove 189 of the damper means 18 is abutted against the stopper pin 13c as shown in FIG. 15c. Thus, the damper means 18 begins to perform the deceleration function.

Figure 16A:
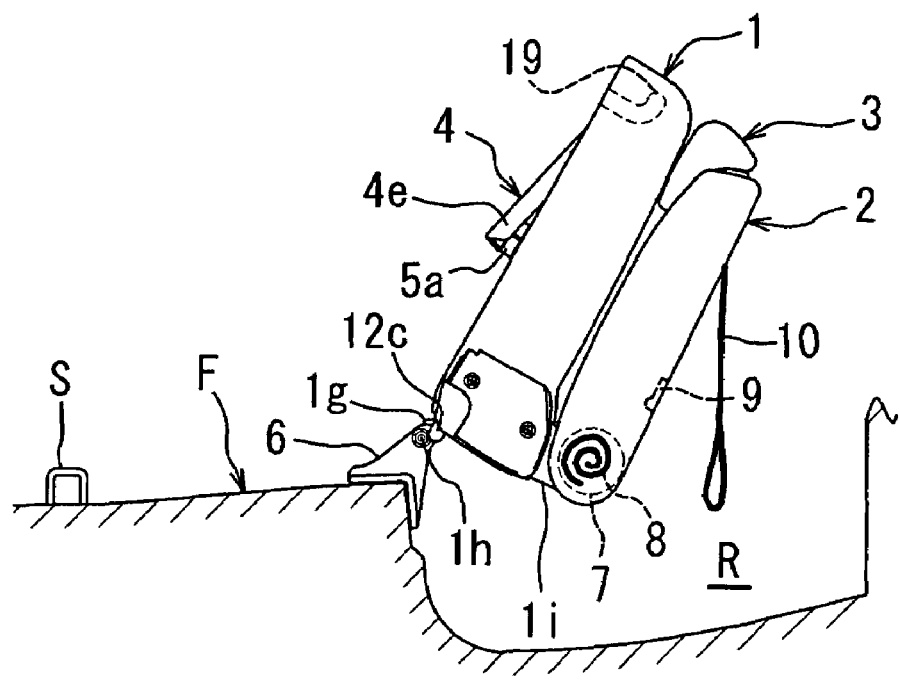
Figure 16B:
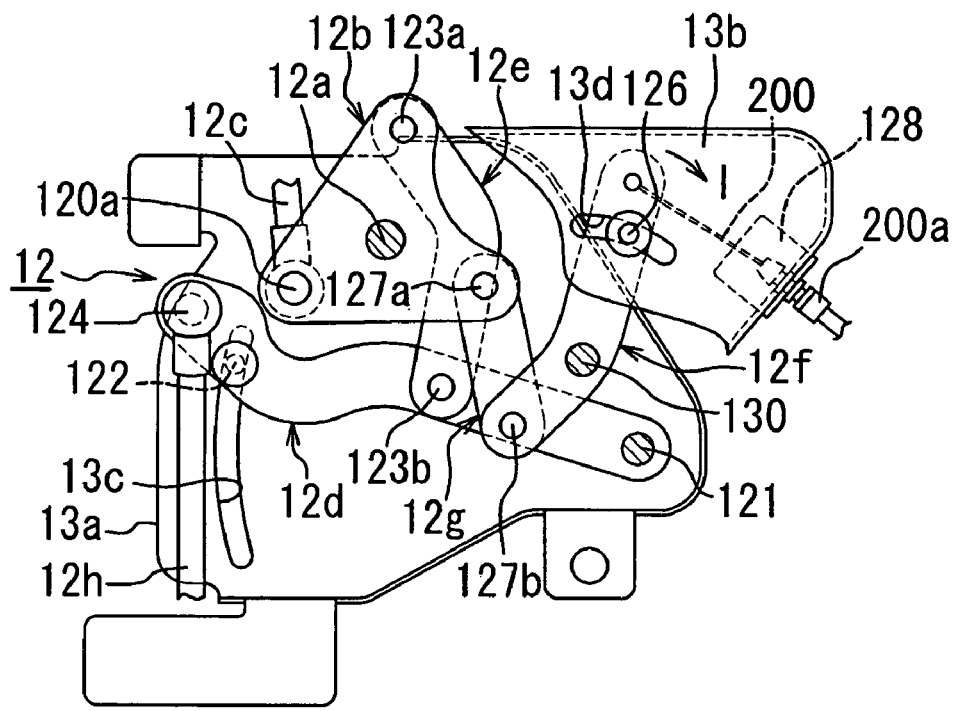
Figure 16C:
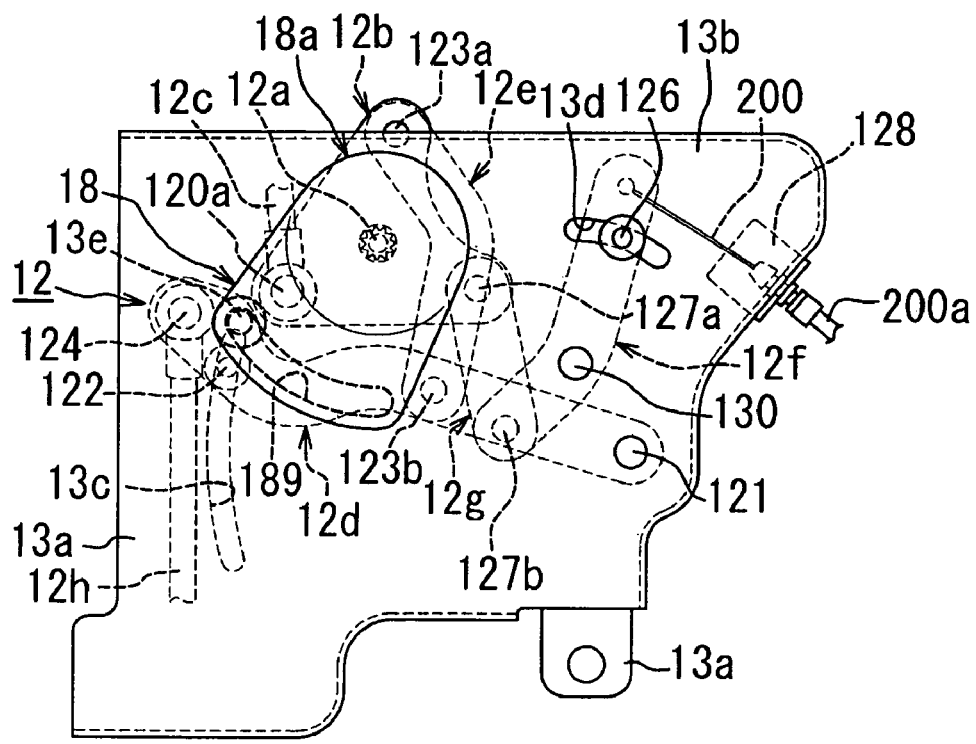

When the seat cushion 1 is still further drawn toward the seat back 2 by the spiral springs 8 as shown in FIG. 16a, the turnable plate 12b is further turned and the second swinging bar 12f is drawn by the second connecting bar 12g in such a direction as to be indicated in FIG. 16b by an arrow I. As a result, a tension that has been applied to the third traction cable 200 till now is released, whereby the recliner devices 7, 7' are actuated so as to be locked and the seat cushion and seat back are kept put together. During this drawing of the seat cushion 1 toward the seat back 2, the damper means has been actuated as shown in FIG. 16c, so that the movement of the seat cushion toward the seat back is decelerated and the pivotal movement of the vehicle seat toward the stored position is also decelerated. Thus, the vehicle seat can be slowly and stably pivoted toward the stored position.

Figure 17A:
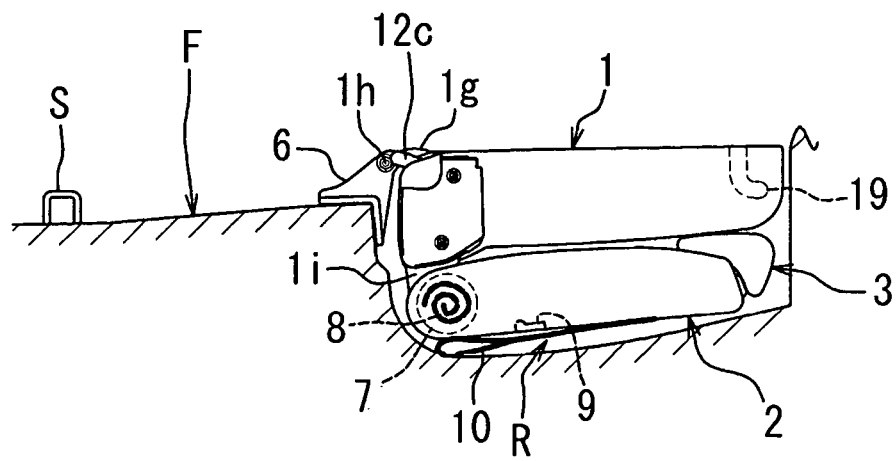
FIGS. 17a-20 are each a schematic view which is of assistance in explaining pivotal movement of the vehicle seat from the stored position toward the seating position.
Figure 17B:
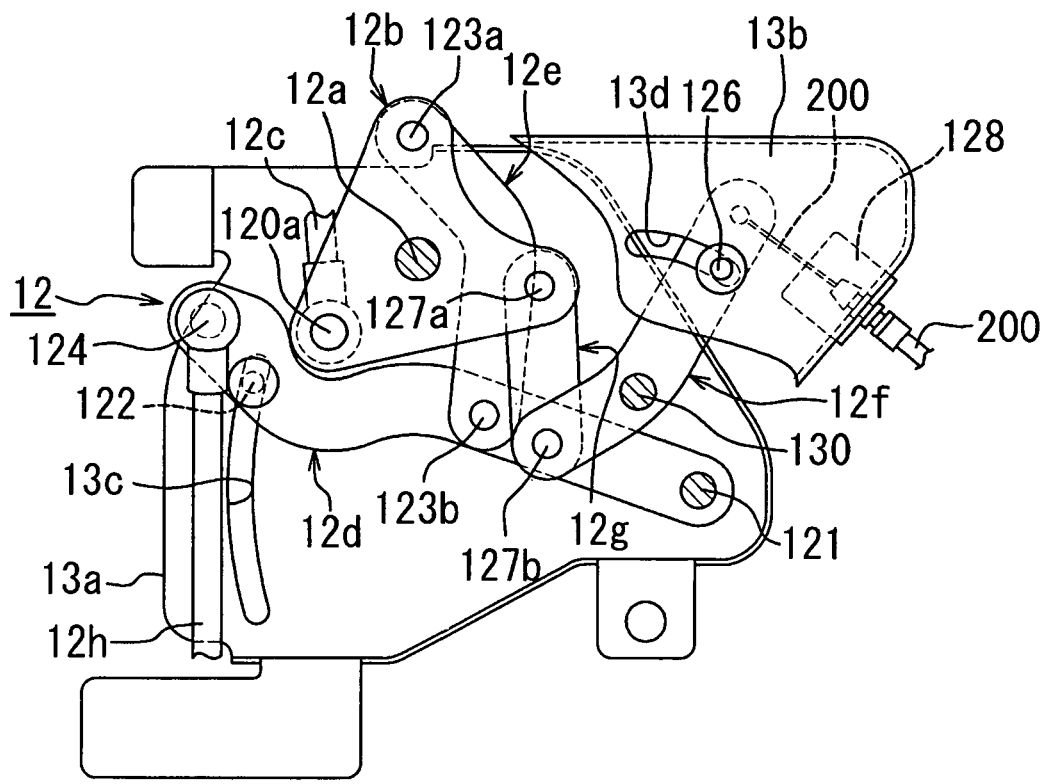
Figure 17C:
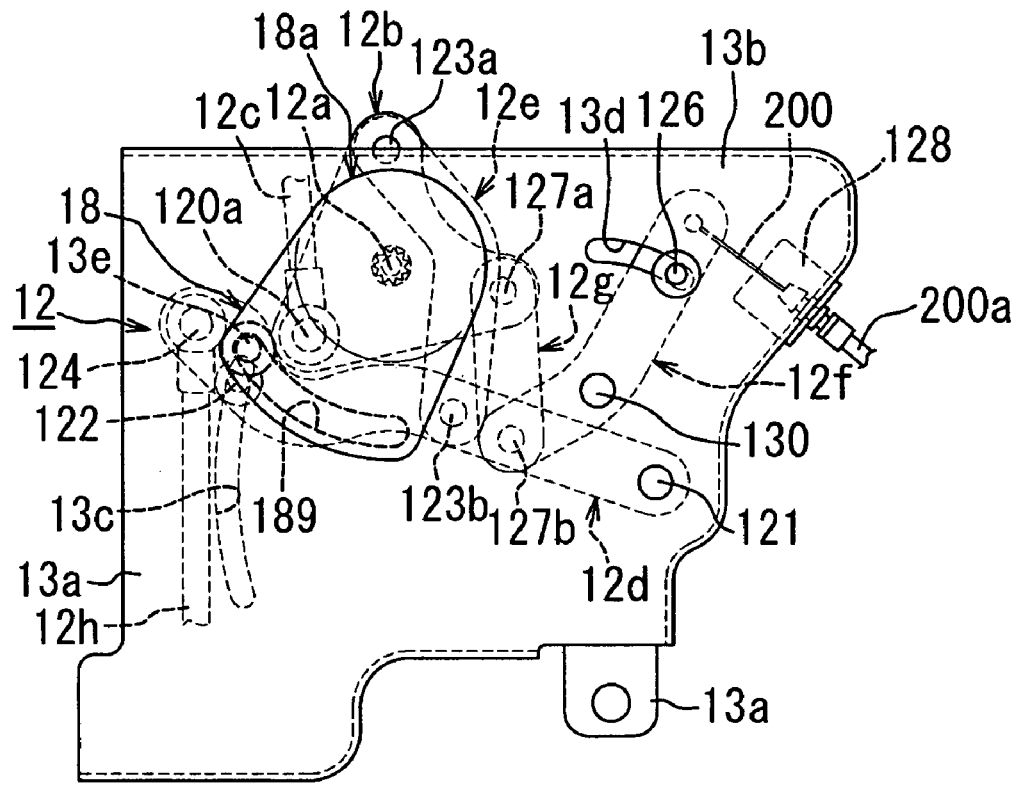

In the condition where the seat cushion 1 and the seat back are put together by the recliner devices, the user causes the entire seat to be further pivoted rearward while inserting the user's hand into the hollow section of the pull pocket structure, whereby the entire seat is stored within the storage recess portion R of the vehicle floor F as shown in FIG. 17a. At this time, the third traction cable 200 is not pulled as shown in FIG. 17b, the recliner devices 7, 7' remain locked and the damper means 18 remains actuated as shown in FIG. 17c, so that the entire seat can be stably stored within the recess portion R of the vehicle floor F.

Figure 18A:
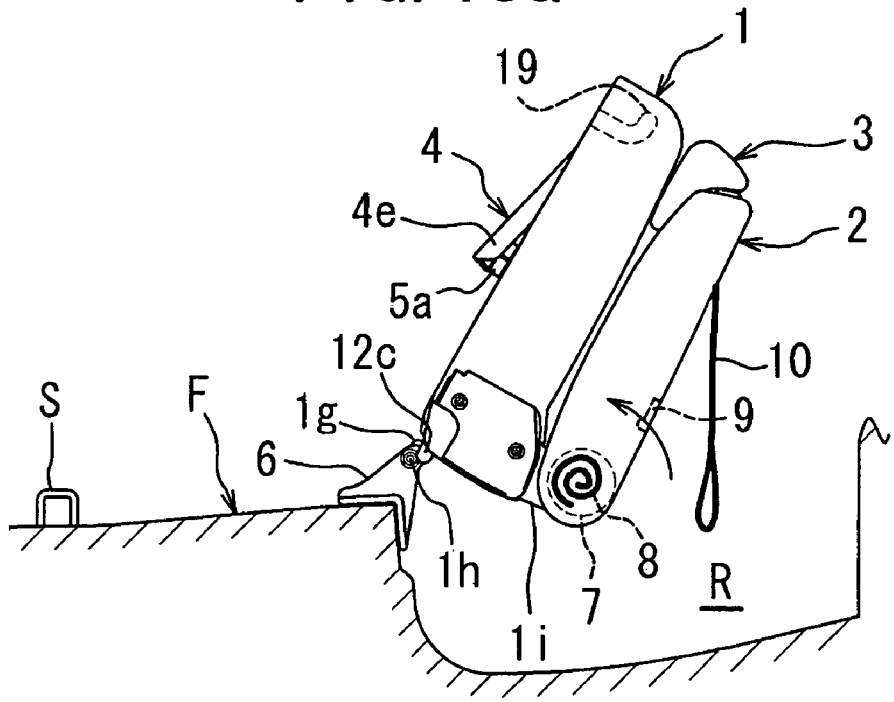
Figure 18B:
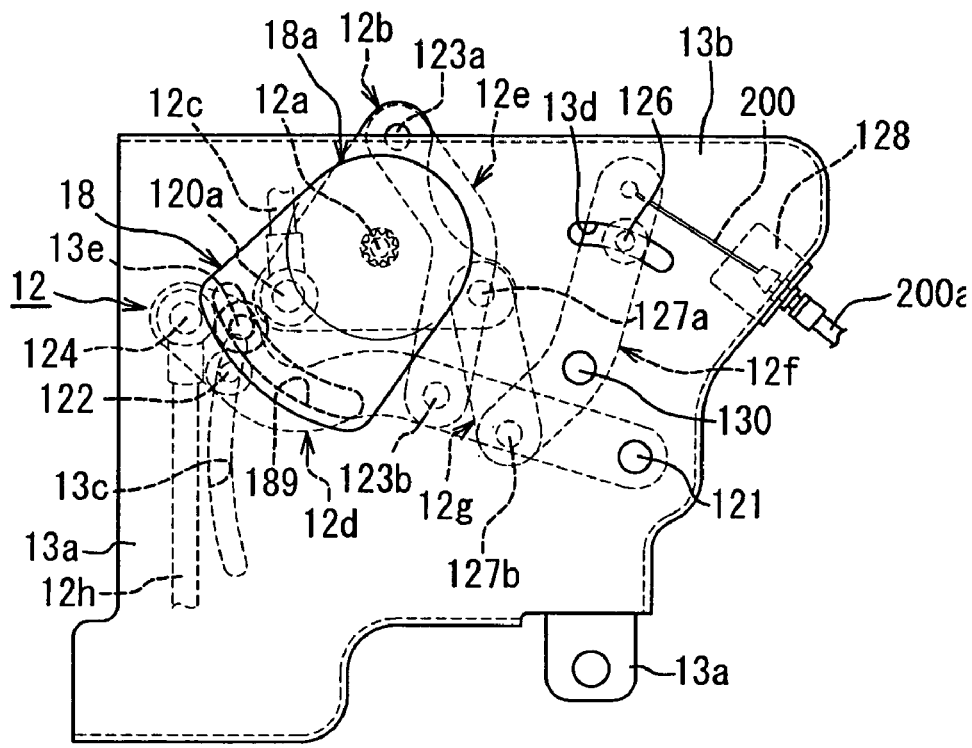

Referring now to FIGS. 18a to 20, the pivotal movement of the vehicle seat toward the seating position from the stored position will be discussed in detail hereinafter. When the vehicle seat is to be pivoted toward the seating position from the stored position, the user inserts the user's hand into the hollow section of the pull pocket means 19 and then lifts the entire vehicle seat up from the storage recess portion R as shown in FIG. 18a. As the entire vehicle seat is lifted up, the linkage means 12 begins to be actuated so as to be returned to its original state as shown in FIG. 18b, whereby the damper means 18 begins to be returned to its original state and the seat leg means 4 also begins to be pivoted toward the use position from the non-use position.

During the pivotal movement of the vehicle seat toward the seating position, the second swinging bar 12f is swung about the supporting pin 130 while drawing the third traction cable 200, whereby the recliner devices 7, 7' are unlocked. At this time, even if the recliner devices 7, 7' are unlocked, the seat cushion 1 and the seat back 2 remain put together due to the actions of the spiral springs 8, so that the vehicle seat can be stably pivoted forward from the stored position.

Figure 19A:
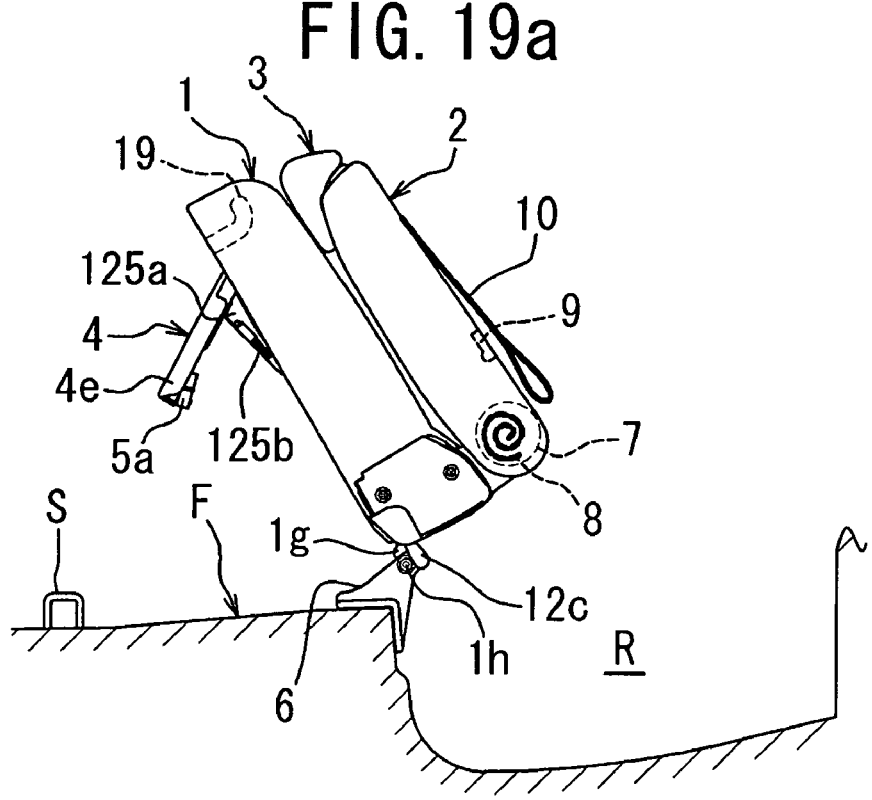
Figure 19B:
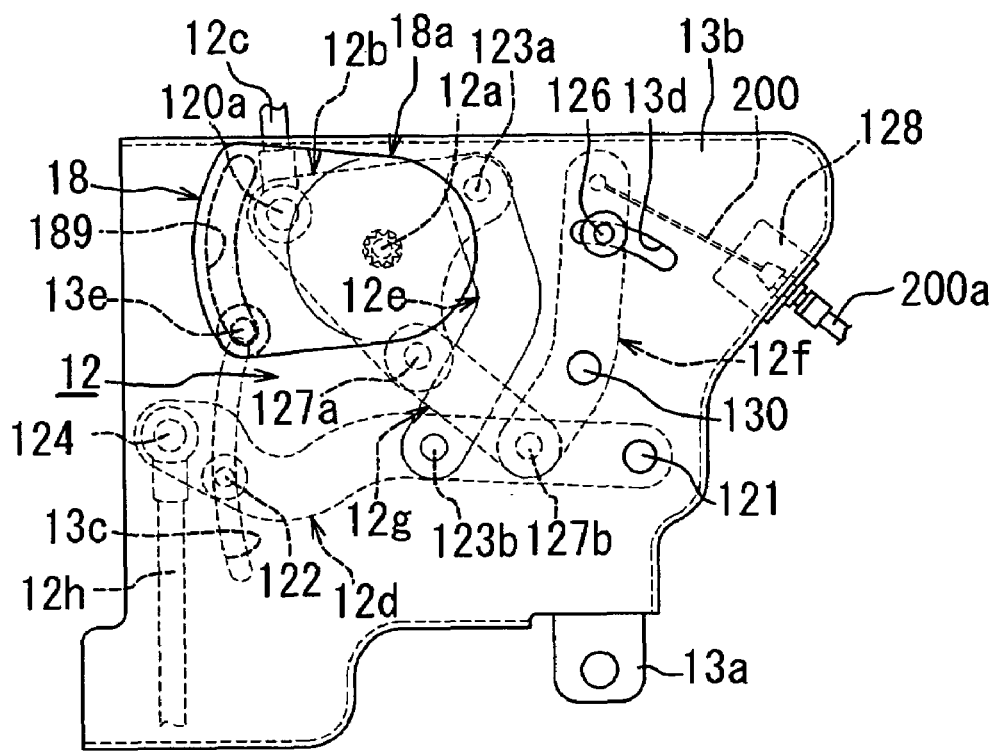

As the vehicle seat is further pivoted toward the seating position as shown in FIG. 19a, the main driving rod 12c draws the turnable plate 12b and the driven rod 12h is moved so as to push the seat leg means 4, whereby the seat leg means 4 is further pivoted and brought to the use position.

Figure 20:
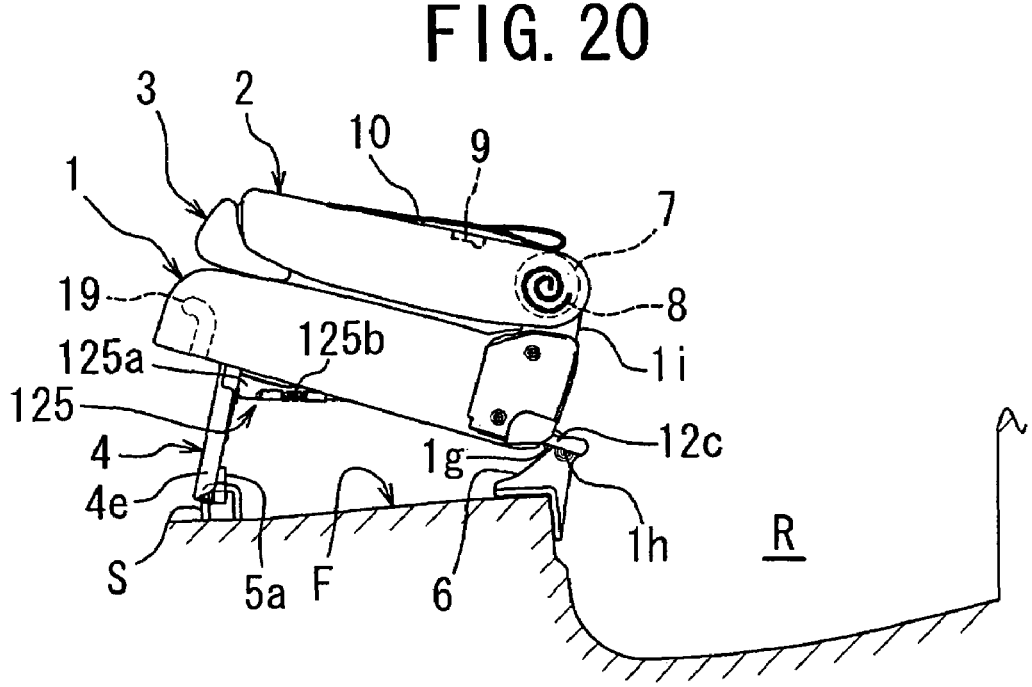

Further pivotal movement of the vehicle seat is carried out in the condition where the seat cushion 1 and the seat back 2 remain folded and put together due to the actions of the spiral springs 8, until the striker locks 5a, 5b are engaged with the striker S. By engagement of the striker locks 5a, 5b with the striker S, the vehicle seat is brought to the seating position. After the striker locks 5a, 5b are engaged with the striker S as shown in FIG. 20, the user pulls the strap 10, to thereby cause the recliner devices 7, 7' to be unlocked. In the condition where the recliner devices 7, 7' are unlocked, the user pulls the traction strap 10 and can cause the seat back 2 to be pivoted so as to stand up from the seat cushion 1 that has been seated on the vehicle floor F through the seat leg means 4. Thus, the seat back 2 is brought to a condition where the user can sit on the vehicle seat.

As discussed above, in the first embodiment according to the present invention, by a single motion of the vehicle seat, namely, by causing the vehicle seat to be pivoted forward or rearward, it is possible to cause the seat cushion and the seat back to be folded together or separated from each other, cause the seat leg means 4 to be pivoted toward the non-use position or the use position and cause the recliner devices 7, 7' to be locked or unlocked. Therefore, it is possible to cause the entire vehicle seat to be easily and quickly brought to the stored condition or usable condition.

Figure 21:
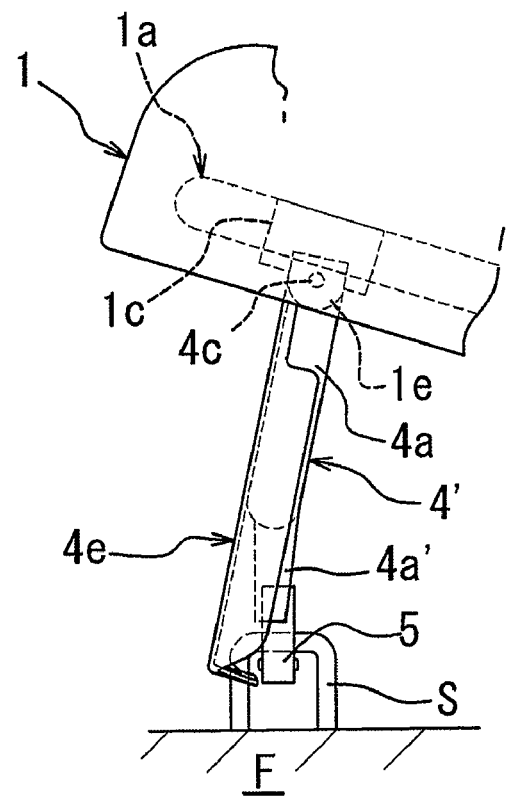
FIG. 21 is a schematic side elevational view of a seat leg means.
Figure 22:
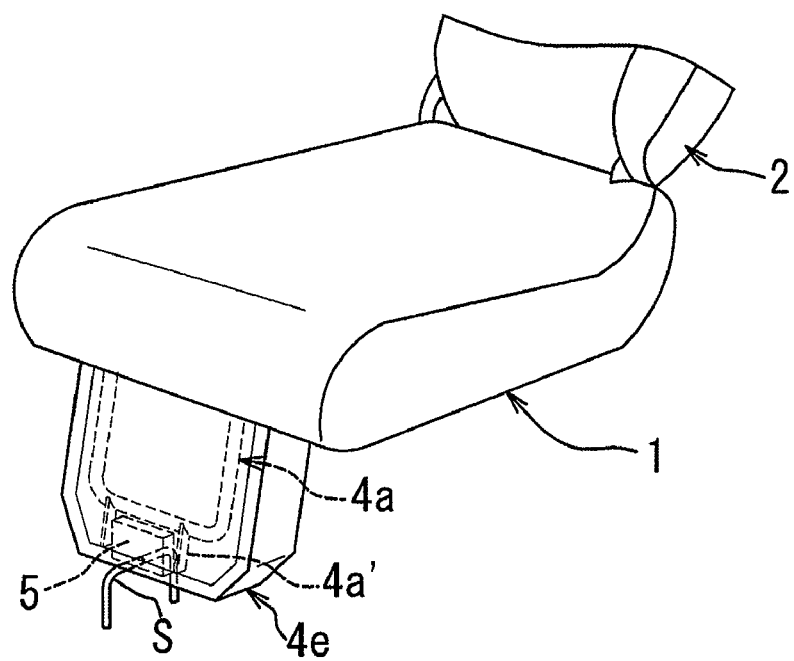
FIG. 22 is a schematic perspective view of the vehicle seat and the seat leg means.

Referring to FIGS. 21 and 22, there is illustrated a modification 4' of the seat leg means. The seat leg means 4' is substantially similar to the seat leg means 4 except that the substantially U-shaped leg body 4a has a bracket plate 4a' obliquely hanging down from a lower portion of the substantially U-shaped body 4a, the front side plate 4b shown in FIG. 2 is omitted, and the resinous armor cover 4e is attached directly to the leg body 4a. In the modification 4' shown in FIGS. 21 and 22, only one striker lock 5 that is constructed in the substantially same manner as each of the striker locks 5a, 5b shown in FIG. 3 is done is attached to the bracket plate 4a' in lieu of the striker locks 5a, 5b, and a front surface of the resinous armor cover 4c is covered with a sheet of fabric or the like. Since the resinous armor cover 4e of the seat leg means 4' has the seat of fabric material applied onto the front surface thereof, a visual appearance of the vehicle seat is improved.

Figure 23:
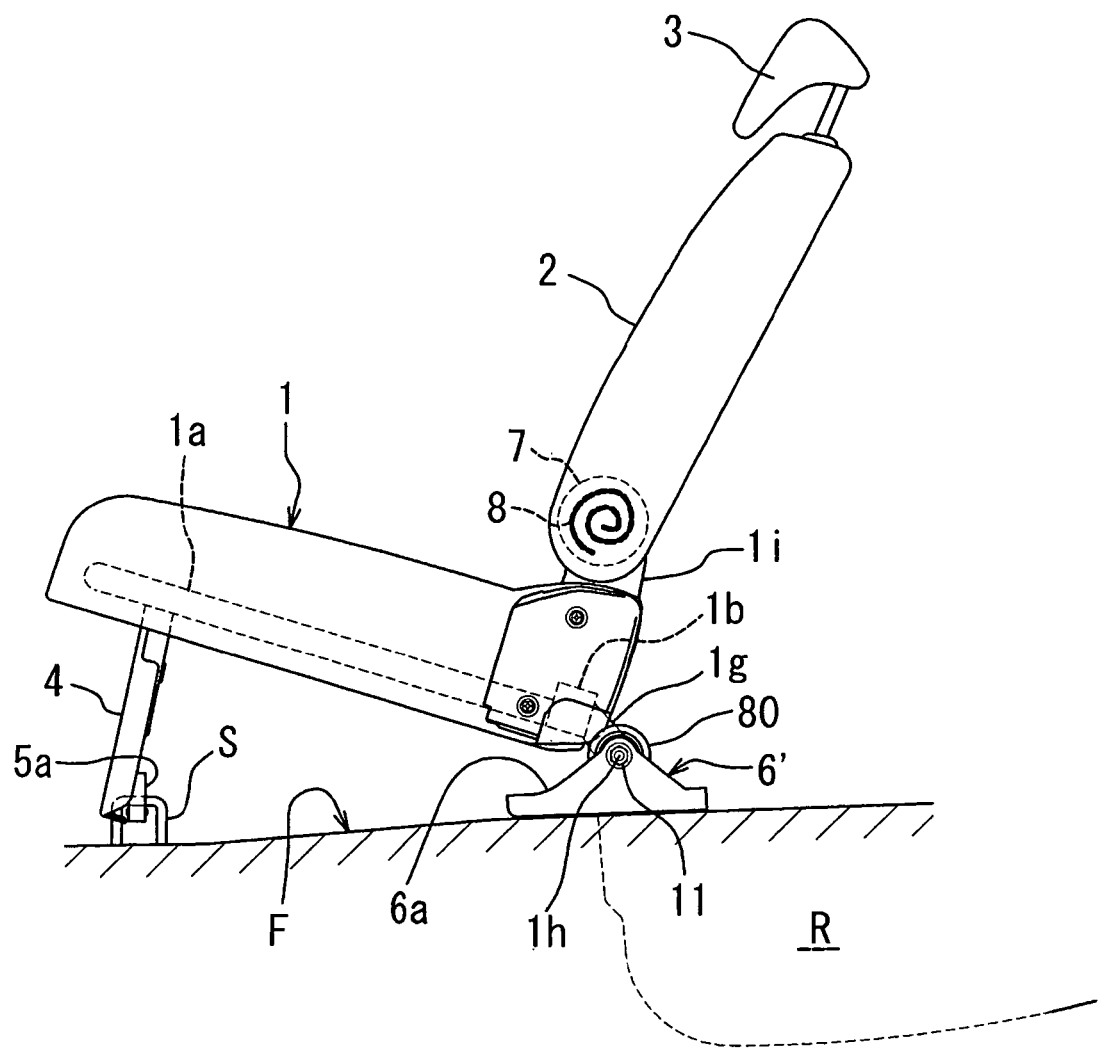
FIG. 23 is a schematic side elevational view of a vehicle seat according to a second embodiment of the present invention.
Figure 24:
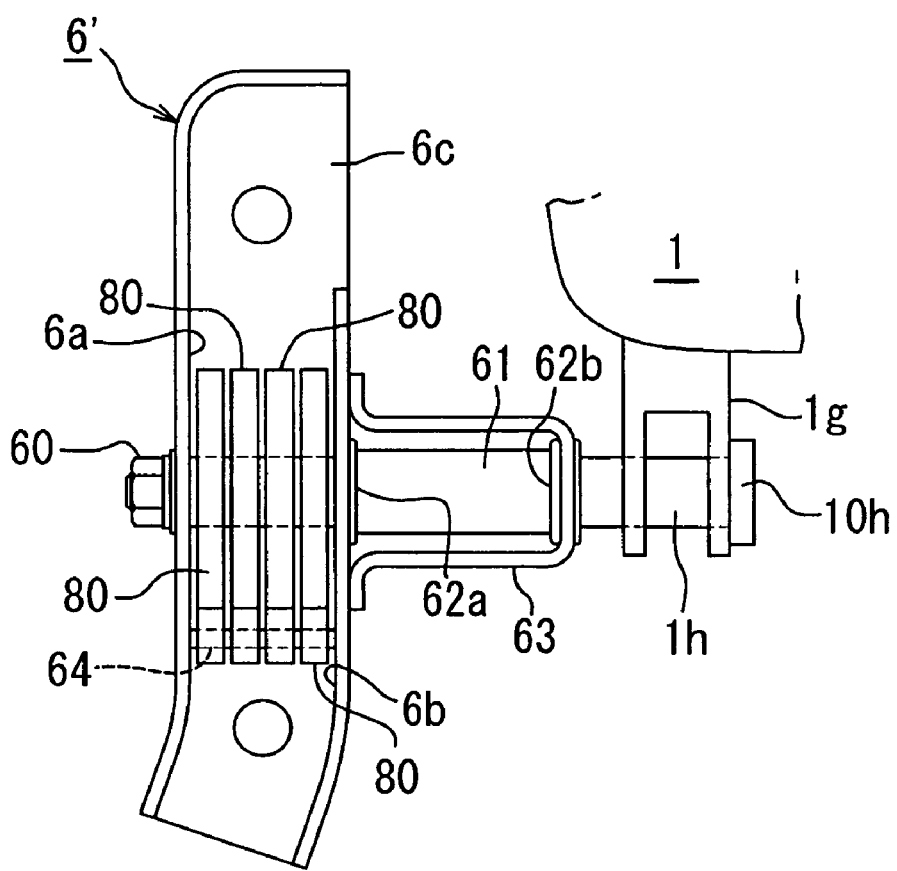
FIG. 24 is a schematic plan view of a base bracket structure employed in the vehicle seat shown in FIG. 23.
Figure 25:
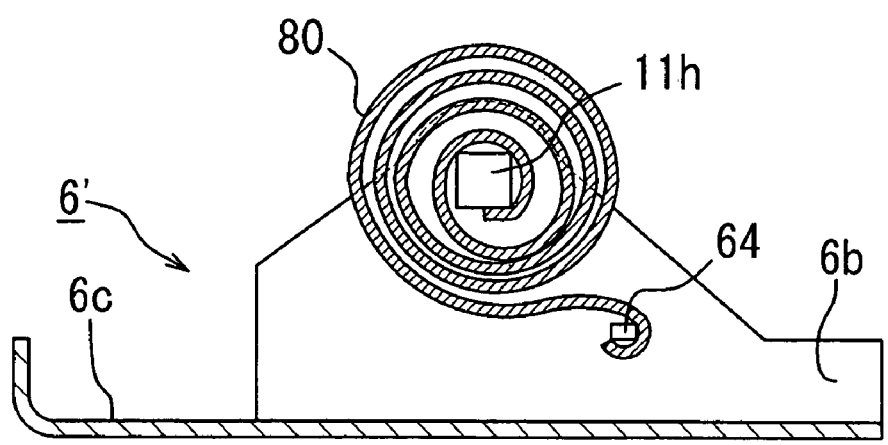
FIG. 25 is a schematic side sectional view of the base bracket structure of FIG. 24.

Referring to FIGS. 23 to 25, a vehicle seat according to a second embodiment of the present invention will be discussed hereinafter. The vehicle seat according to the second embodiment of the present invention is generally similar to that according to the first embodiment except that a plurality of second spiral springs 80 are mounted around at least one of the supporting shafts 1h through which the bearing brackets 1g of the seat cushion 1 are coupled to spaced apart base brackets 6' mounted to the vehicle floor F (only one supporting shaft 1h, only one bearing 1g and only one base bracket 6' are shown in FIGS. 23 to 25). In the illustrated example, the second spiral springs 80 are mounted around the supporting shaft 1h of the base bracket 6' arranged adjacent a center portion of the vehicle. In the modification of FIGS. 23 to 25, parts which are similar to those shown in FIG. 1 are designated with like reference numerals and the description of them will not be repeated.

As shown in FIGS. 24 and 25, the base bracket 6' which is arranged adjacent the center portion of the vehicle comprises a pair of spaced apart rising wall sections 6a, 6b and an intermediate plate section 6c interconnecting the rising wall sections 6a, 6b. The intermediate plate section 6c is secured onto the vehicle floor F. As shown in FIG. 24, the intermediate plate section 6c extends linearly from a forward end thereof toward a region thereof which is adjacent a rear end of the intermediate plate section 6c, and curved outward from the region of the intermediate plate section 6c to the rear end of the intermediate plate section 6c in order that the base bracket 6' can resist a twisting force that may be applied to the base bracket 6' through the supporting shaft 1h when the occupant uses a seat belt while the vehicle is running.

The supporting shaft 1h penetrates the rising wall sections 6a, 6b and is coupled to a corresponding bearing bracket 1g of the seat cushion 1. The supporting shaft 1h comprises a square bar-shaped section 11h extending between the rising wall sections 6*a*, 6*b*, and a round bar-shaped section extending between the rising wall section 6*b* and the bearing bracket 1*g* of the seat cushion 1. Furthermore, the supporting shaft 1*h* has a length enough to support the seat cushion 1 in such a manner that the seat cushion 1 is spaced apart from the base bracket 6'. The supporting shaft 1*h* has a large diameter head 10*h* projecting laterally from the bearing bracket 1*g* of the seat cushion 1. A nut 60 is threadedly mounted on an end of the supporting shaft 1*h* which projects laterally from the rising wall section 6*a*, whereby the supporting shaft 1*h* is prevented from slipping off from the base bracket 6' and the bearing bracket 1*g*.

A sleeve 61 is mounted around a section of the supporting shaft 1*h* between the rising wall section 6*b* and the bearing bracket 1*g* of the seat cushion 1. The sleeve 61 is interposed by rings 62*a*, 62*b* mounted around the section of the supporting shaft 1*h*. Each of the rings 62*a*, 62*b* is formed of lubricous resin material. Furthermore, the sleeve 61 is retained by a substantially U-shaped bracket 63 that is secured at both sides thereof to the rising wall section 6*b* of the base bracket 6'. Thus, the round bar-shaped section of the supporting shaft 1*h* is reinforced so as to resist a twisting force that may be applied to the supporting shaft 1*h* when the occupant uses the seat belt while the vehicle is running. The second spiral springs 80 are wound around the square section of the supporting shaft 1*h* between the rising wall sections 6*a*, 6*b* of the base bracket 6'.

As shown in FIG. 25, the second spiral springs 80 (only one second spiral spring 80 is shown in FIG. 25) that are wound around the square bar-shaped section 11*h* of the supporting shaft 1*h* are secured at innermost ends of the second spiral springs 80 to the square bar-shaped section 11*h* of the supporting shaft 1*h* and secured at outermost ends of the second spiral springs 80 to a cross beam 64 that is bridged between the rising wall sections 6*a*, 6*b* of the base bracket 6'. Each of the second spiral springs 80 is previously designed such that it is elastically contracted so as to be further wound around the supporting shaft 1*h* when the vehicle seat is pivoted toward the stored position, and elastically expanded so as to be unwound from the supporting shaft 1*h* when the vehicle seat is pivoted toward the seating position.

The number of the second spiral springs 80 is the degree to which the second spiral springs 80 substantially take up a space between the rising wall sections 6*a*, 6*b* of the base bracket 6'. For example, two to five spiral springs 80 may be mounted around the supporting shaft 1*h* and arranged side by side along the supporting shaft 1*h*. The second spiral springs 80 not only serve to facilitate the pivotal movement of the vehicle seat toward the seating position but also serve to maintain stiffness of the base bracket 6' and the supporting shaft 1*h*.

In the second embodiment constructed as discussed above, the combination comprising the base bracket 6', the supporting shaft 1*h* and the second spiral springs 80 adds stiffness to the base bracket 6'. Therefore, even if the combination is provided only on a side of the vehicle seat that is adjacent the center portion of the vehicle and easy to be subjected to a twist force that may be produced by the use of the seat belt, the combination can exhibits stiffness enough to resist the twisting force.

Figure 26:
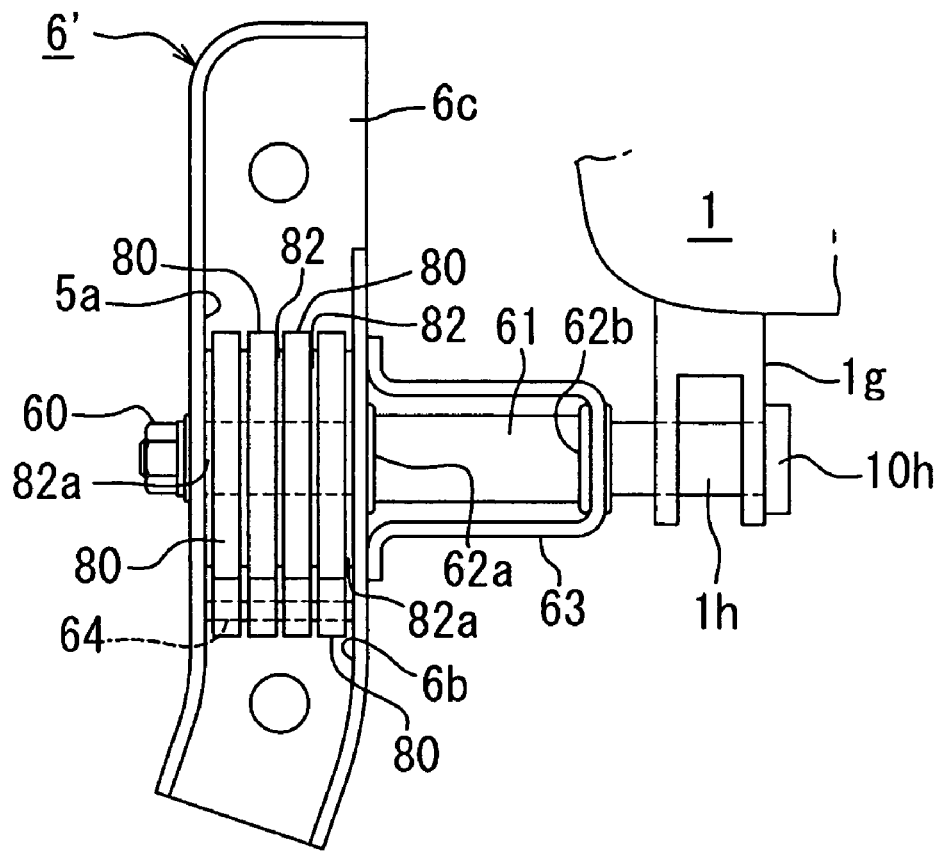
FIG. 26 is a schematic plan view of a modification of the base bracket structure shown in FIG. 24.
Figure 27:
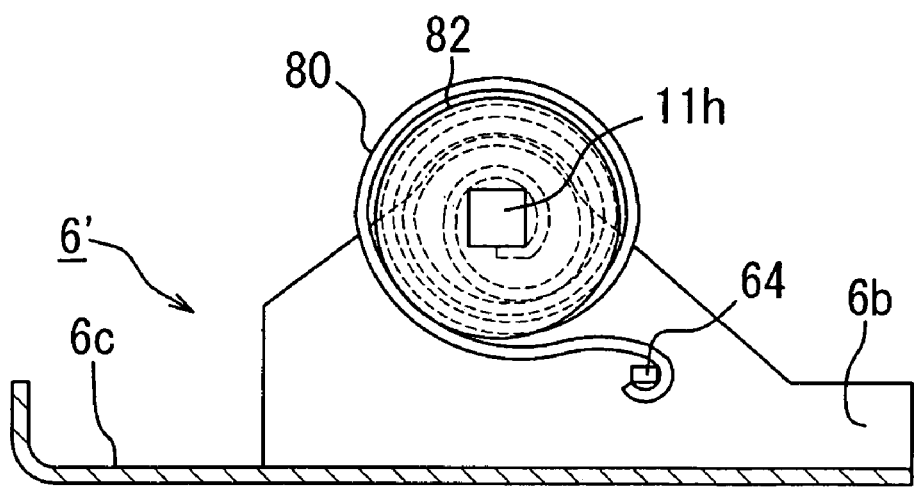
FIG. 27 is a schematic side sectional view of the base bracket structure shown in FIG. 26.

Referring now to FIGS. 26 and 27, ring-shaped collars 82 may be mounted on the supporting shaft 1*h* so as to be arranged between adjacent spiral springs 80 as spacer members for the spiral springs 80. Ring-shaped collars 82*a* may be also provided between the rising wall section 6*a* of the base bracket 6' and a spiral spring 80 that is adjacent the rising wall section 6*a*, and between the rising wall section 6*b* of the base bracket 6' and a spiral spring 80 that is adjacent the rising wall section 6*b*. By the ring-shaped collars 82, 82*a*, the stiffness of the base bracket 6' can be increased.

In the second embodiment constructed as discussed above, when the user causes the entire vehicle seat to be pivoted toward the stored position from the seating position while inserting the user's hand into the hollow section of the pull pocket structure and lifting up the entire vehicle seat in a condition where the striker locks 5*a*, 5*b* are released from the striker S, the second spiral springs 80 are elastically contracted so as to be further wound around the supporting pins 1*h*. Contrary, when the user causes the entire vehicle seat to be pivoted toward the seating position from the stored position while inserting the user's hand into the hollow section of the pull pocket structure and lifting up the entire vehicle seat, the second spiral springs 80 are elastically expanded so as to be unwound from the supporting pins 1*h*. Thus, the user can easily cause the entire vehicle seat to be pivoted toward the seating position with resort to the actions of the second spiral springs 80.

While the second spiral springs 80 are mounted around the supporting shaft 1*h* of the base bracket 6' arranged adjacent the center portion of the vehicle in the illustrated example, the second spiral springs 80 may be also mounted around the supporting shaft of the base bracket arranged adjacent a body side of the vehicle.

Figure 28:
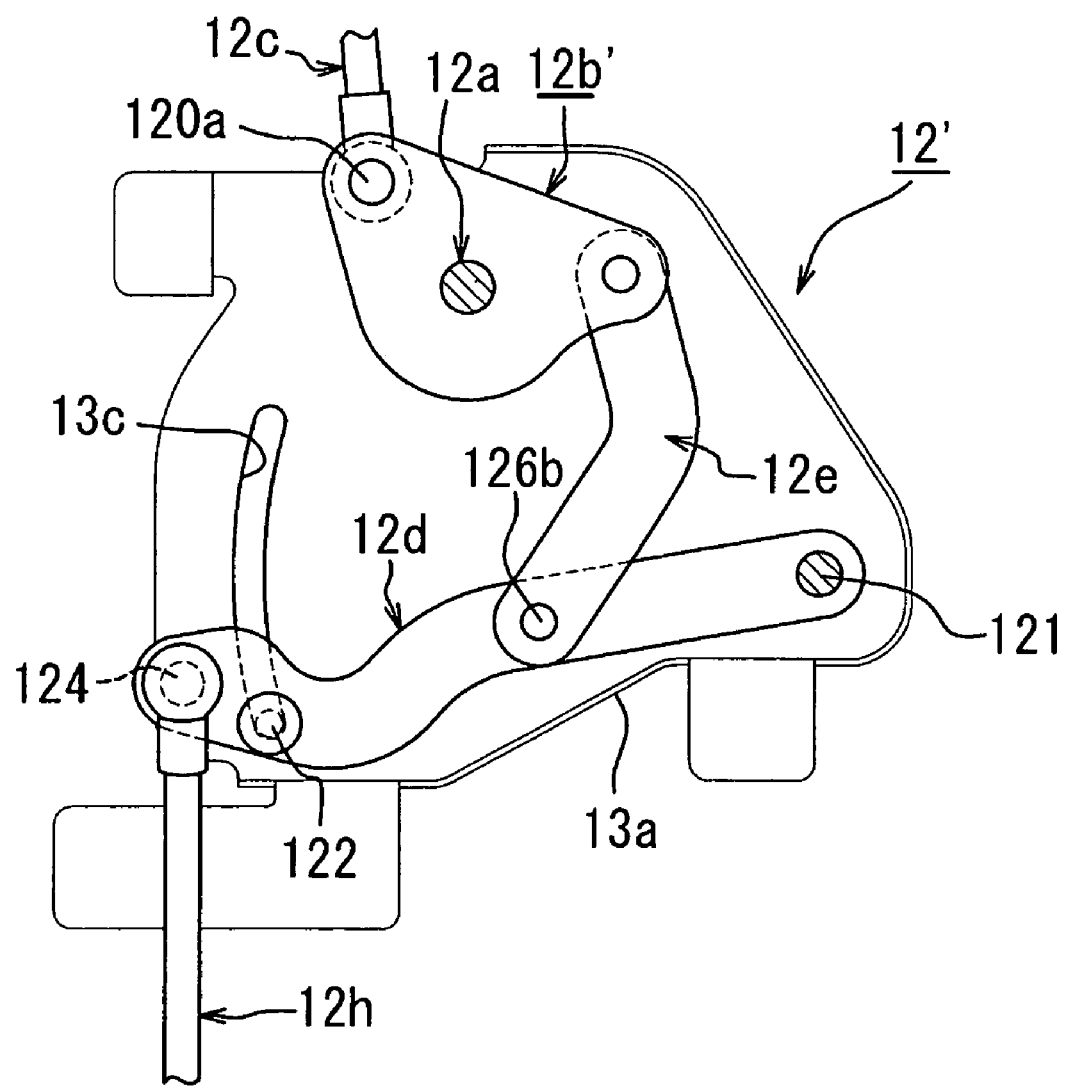
FIG. 28 is a schematic plan view of a linkage means of a vehicle seat according to a third embodiment of the present invention.

Referring to FIG. 28, there is illustrated a linkage means 12' of a vehicle seat according to a third embodiment of the present invention. This embodiment is substantially similar to the first embodiment except that the linkage means 12' is different from the linkage means 12 of the first embodiment. The linkage means 12' is different from the linkage means 12 only in that the linkage means 12' is not provided with the recliner device-driving linkage section. The seat leg means-driving linkage section of the linkage means 12' is substantially similar to the seat leg means-driving linkage section of the first embodiment except that a turnable plate 12*b'* different in shape from the turnable table 12*b* of the first embodiment is employed, namely, the turnable plate 12*b'* that is formed into a substantially sector shape is employed. The linkage means 12' is actuated in the same manner as the seat leg means-driving linkage section of the linkage means 12 is done. Therefore, the description of the linkage means 12' will not be repeated.

Incidentally, in lieu of the linkage means 12 of the first embodiment, a linkage means that is not provided with the seat leg means-driving linkage section may be employed.

Figure 29:
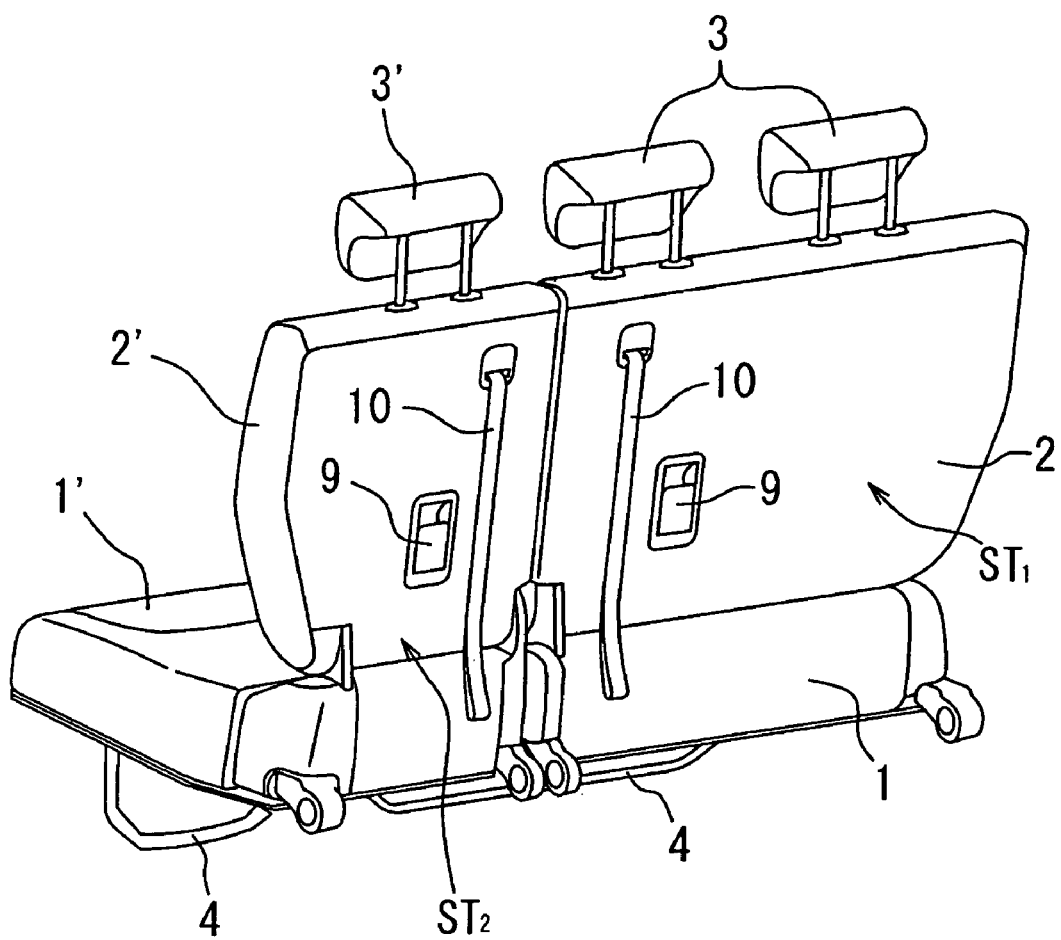
FIG. 29 is a schematic perspective view of a semi-separate seat as viewed from the rear side, to which the present invention may be applied.

Referring to FIG. 29, there is illustrated a semi-separate seat that comprises a bench seat $ST_1$ and an individual seat $ST_2$. The present invention may be applied the semi-separate seat.

The terms and expressions which have been employed are used as terms of description and not of limitation, and there is no intention in the use of such term and expressions of excluding any equivalents of the features shown and described, or portions thereof, but it is recognized that various modifications are possible within the scope of the invention claimed.

We claim:

1. A foldable and storable seat for a vehicle, comprising:
   a seat cushion pivotally supported at a rear portion thereof to a vehicle floor by a pair of spaced apart base brackets;
   a seat back pivotally supported to said seat cushion;

said seat back including a seat back frame which has a bracket plate arranged on a side of said seat back frame which is adjacent a center portion of said vehicle;

a seat leg means pivotally supported to a forward portion of a bottom of said seat cushion:

said seat leg means being adapted to be operatively folded so as to lie flat against a bottom surface of said seat cushion;

cooperating means for causing said seat leg means to be releasably supported to said vehicle floor;

said cooperating means comprising a striker mounted to said vehicle floor, and striker lock means attached to a lower portion of said seat leg means and adapted to be releasably engaged with said striker;

an operating lever for causing said striker lock means to be disengaged from said striker;

recliner means for releasably locking said seat back relative to said seat cushion;

said seat cushion and said seat back being designed such that they can be folded so as to be put together when said seat back is released from said seat cushion by said recliner means;

an actuating lever for causing said recliner means to be actuated;

said actuating lever having a traction strap extending rearward of said seat back from said actuating lever;

said operating lever and said actuating lever being pivotally supported to said bracket plate of said seat back so as to be disposed in close proximity to each other; and linkage means mounted to said seat cushion;

said linkage means including a first linkage section for causing said recliner means to be actuated synchronously with pivotal movement of said vehicle seat; and said first linkage section being coupled to one of said base brackets and said recliner means.

2. A foldable and storable seat for a vehicle according to claim 1, wherein said linkage means further includes a second linkage section for causing said seat leg means to be operatively folded so as to lie flat against said bottom surface of said seat cushion synchronously with folding of said seat cushion and said seat back, and causing said seat leg means to be pivoted to its use position synchronously with forward pivotal movement of said vehicle seat.

3. A foldable and storable seat for a vehicle according to claim 1, further including spring means provided between said seat cushion and said seat back for urging said seat cushion and said seat back in such a direction that said seat cushion and said seat back are drawn toward each other, and for allowing said seat cushion and said seat back to be drawn toward to each other so as to be folded in such a manner to be put together when said seat back is released from said seat cushion by said recliner means, and a damper means for causing the pivotal movement of said vehicle seat to be decelerated, said damper means being combined with said linkage means.

4. A foldable and storable seat for a vehicle according to claim 1, wherein said vehicle seat further includes an armor cover covering said seat leg means and said striker lock means.

5. A foldable and storable seat for a vehicle according to claim 1, wherein said spaced apart base brackets are mounted on said vehicle floor, said seat cushion is pivotally supported at said rear portion thereof to said spaced apart base brackets by supporting shafts, and said vehicle seat further includes a plurality of spiral springs mounted around a supporting shaft which is attached to at least one of said spaced apart base brackets which is arranged adjacent said center portion of said vehicle, said at least one of said spaced apart base brackets having a pair of spaced apart rising wall sections, an intermediate plate section interconnecting the pair of spaced apart rising wall sections, and a cross beam bridged between the pair of spaced apart rising wall sections, said supporting shaft being borne by said rising wall sections, said spiral springs being arranged between the pair of spaced apart rising wall sections and side by side along said supporting shaft with innermost ends thereof being secured to said supporting shaft and with outermost ends thereof secured to said cross beam, and said spiral springs serving as means to facilitate forward pivotal movement of said vehicle seat and serving as means to add stiffness to said supporting shaft and said at least one of said spaced apart base brackets.

6. A foldable and storable seat for a vehicle according to claim 1, wherein said seat cushion includes a seat cushion frame, said vehicle floor having a storage recess portion in which said vehicle seat is to be stored, and said vehicle seat further includes a pull pocket structure having a hollow section into which a user can insert a user's hand and facilitating the pivotal movement of said vehicle seat when said vehicle seat is pivoted, said pull pocket structure being attached to a suitable portion of said seat cushion frame or of said seat back frame which does not exert adverse effect on a seating feeling of an occupant having sat on said vehicle seat.

7. A foldable and storable seat for a vehicle according to claim 3, wherein said seat cushion includes a seat cushion frame, and said linkage means includes a base frame attached to said seat cushion frame, a rotating pin rotatably supported to said base frame, a turnable plate supported to said rotating pin for rotation therewith, said turnable plate having first and second peripheral portions, and a driving rod coupled at one end thereof to one of said spaced apart base brackets and coupled at the other end thereof to said first peripheral portion of said turnable plate, said first linkage section being coupled to said second peripheral portion of said turnable plate and coupled to said recliner means via a traction cable, and said damper means being mounted on said rotating pin.

8. A foldable and storable seat for a vehicle according to claim 3 or 7, wherein said damper means is designed such that it causes the pivotal movement of said vehicle seat to be decelerated in the course of the pivotal movement of said vehicle seat.

9. A foldable and storable seat for a vehicle according to claim 5, wherein said at least one base bracket includes first collars serving as spacer members for said spiral springs, said first collars being mounted on said supporting shaft so as to be arranged between respective adjacent spiral springs, and second collars being mounted on said supporting shaft so as to be arranged between one of said rising wall sections and a spiral spring that is adjacent the one of said rising wall sections, and between the other of said rising wall sections and a spiral spring that is adjacent the other of said rising wall sections.

10. A foldable and storable seat for a vehicle according to claim 6, wherein said pull pocket structure comprises a pull pocket and a substantially belt-shaped support member that is formed into a substantially trapezoidal shape, said pull pocket comprising a pull pocket body which has said hollow section and is formed into a substantially L-shape in outline, and a flange section formed integrally with a peripheral edge of an opening of said hollow section, said hollow section having a shape corresponding to that of said pull pocket body, said substantially belt-shaped support member being fixed at both ends thereof to an approximately middle portion of a front section of said seat cushion frame, and said substantially L-shaped pull pocket body being attached to said substantially belt-shaped support member with a horizontal portion thereof being disposed between said substantially belt-shaped support member and said front section of said seat cushion frame, with a portion of said flange section being engaged with said front section of said seat cushion frame, and with said horizontal portion of said substantially L-shaped pull pocket body being secured to said substantially belt-shaped support member.

11. A foldable and storable seat for a vehicle according to claim 1, further including spring means provided between said seat cushion and said seat back for urging said seat cushion and said seat back in such a direction that said seat cushion and said seat back are drawn toward each other, and for allowing said seat cushion and said seat back to be drawn toward to each other so as to be folded in such a manner to be put together when said seat back is released from said seat cushion by said recliner means, said first linkage section being coupled to said recliner means via a traction cable.

12. A foldable and storable seat for a vehicle according to claim 1, wherein said seat cushion includes a seat cushion frame, said vehicle seat further includes spring means provided between said seat cushion and said seat back for urging said seat cushion and said seat back in such a direction that said seat cushion and said seat back are drawn toward each other, and for allowing said seat cushion and said seat back to be drawn toward to each other so as to be folded in such a manner to be put together when said seat back is released from said seat cushion by said recliner means, and said linkage means includes a base frame attached to said seat cushion frame of said seat cushion, a rotating pin rotatably supported to said base frame, a turnable plate supported to said rotating pin for rotation therewith, said turnable plate having first, second and third spaced apart peripheral portions, a driving rod coupled at one end thereof to one of said spaced apart base brackets and coupled at the other end thereof to said first peripheral portion of said turnable plate, and a second linkage section for causing said seat leg means to be operatively folded so as to lie flat against said bottom surface of said seat cushion synchronously with folding of said seat cushion and said seat back, and causing said seat leg means to be pivoted to its use position synchronously with forward pivotal movement of said vehicle seat, said second linkage section being coupled to said second peripheral portion of said turnable plate, and being coupled to said seat leg means via a driven rod, and said first linkage section being coupled to said third peripheral portion of said turnable plate, and being coupled to said recliner means via a traction cable.

* * * * *